(12) United States Patent
Kesavareddigari et al.

(10) Patent No.: US 12,470,610 B2
(45) Date of Patent: Nov. 11, 2025

(54) HIERARCHICAL PARTITIONING AND SENSOR DATA AGGREGATION IN PERCEPTIVE WIRELESS COMMUNICATIONS SYSTEMS

(71) Applicant: QUALCOMM Incorporated, San Diego, CA (US)

(72) Inventors: Himaja Kesavareddigari, Bridgewater, NJ (US); Qing Li, Princeton Junction, NJ (US); Kyle Chi Guan, New York, NY (US); Kapil Gulati, Belle Mead, NJ (US); Hong Cheng, Basking Ridge, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 352 days.

(21) Appl. No.: 18/331,099

(22) Filed: Jun. 7, 2023

(65) Prior Publication Data
US 2024/0414215 A1    Dec. 12, 2024

(51) Int. Cl.
*H04L 65/1094*    (2022.01)

(52) U.S. Cl.
CPC .............. *H04L 65/1094* (2022.05)

(58) Field of Classification Search
CPC ...... H04L 65/1094; H04L 67/12; H04W 4/70; H04W 4/38; H04W 84/20
See application file for complete search history.

(56) References Cited

U.S. PATENT DOCUMENTS

| | | | |
|---|---|---|---|
| 7,359,836 B2 | 4/2008 | Wren et al. | |
| 8,638,680 B2 | 1/2014 | Sen et al. | |
| 2009/0092112 A1* | 4/2009 | Kim | H04W 84/20 370/338 |
| 2010/0265849 A1* | 10/2010 | Harel | H04L 45/48 370/256 |

(Continued)

FOREIGN PATENT DOCUMENTS

| | | |
|---|---|---|
| EP | 1954004 B1 | 1/2012 |
| EP | 2552168 B1 | 5/2017 |

(Continued)

OTHER PUBLICATIONS

International Search Report and Written Opinion—PCT/US2024/031155—ISA/EPO—Sep. 13, 2024.

*Primary Examiner* — Richard G Keehn
(74) *Attorney, Agent, or Firm* — Holland & Hart LLP

(57) ABSTRACT

Methods, systems, and devices for wireless communications are described. A network entity may partition one or more user equipments (UEs) within a target area into groups and assign one UE per set to be a lead UE to aggregate shared sensor data without large sidelink overhead from multicasting all sensor data or uplink signaling overhead from aggregating data at the network entity. For example, the network entity may transmit, and a UE may receive, a partition request message corresponding to a hierarchical partitioning scheme. The UE may transmit a partition request feedback message in response to the partition request message, which may include an indication of the availability of the UE to act (Continued)

as the lead UE. The UE may receive a partition assignment message from the network entity, which may include a partition between sets of UEs and an indication of the lead UE for the set of UEs.

30 Claims, 19 Drawing Sheets

(56) References Cited

U.S. PATENT DOCUMENTS

| | | |
|---|---|---|
| 2012/0119902 A1 | 5/2012 | Patro et al. |
| 2014/0140395 A1* | 5/2014 | Kim ................... H04N 19/176 |
| | | 375/240.03 |
| 2019/0254144 A1* | 8/2019 | Pandharipande .... H05B 47/155 |
| 2020/0234396 A1* | 7/2020 | Qi ....................... G06F 12/0207 |
| 2021/0152427 A1* | 5/2021 | Kim ........................ H04L 67/12 |

FOREIGN PATENT DOCUMENTS

| | | | |
|---|---|---|---|
| WO | WO-2017007990 A1 | 1/2017 | |
| WO | WO-2018007099 A1 * | 1/2018 | ........... H05B 47/115 |

* cited by examiner

Partition/Group 1

Partition/Group 2

HIERARCHICAL PARTITIONING AND SENSOR DATA AGGREGATION IN PERCEPTIVE WIRELESS COMMUNICATIONS SYSTEMS

FIELD OF TECHNOLOGY

The following relates to wireless communications, including hierarchical partitioning and sensor data aggregation in perceptive wireless communications systems.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The described techniques relate to improved methods, systems, devices, and apparatuses that support hierarchical partitioning (e.g., dynamic grouping and regrouping of sets or subsets of devices) of participating entities (e.g., vehicular user equipments (UEs), cellular UEs, and sensors, among other examples) and sensor data aggregation and sensor data feature aggregation in perceptive wireless communications systems. For example, a network entity may partition one or more UEs within a target area into groups and assign one UE per set to be a lead UE to aggregate raw sensor data and compressed features of sensor data. Such an operation would reduce signaling overheads caused by multicasting raw sensor data, while also reducing inaccuracies caused by aggregating features of sensor data without aggregating the raw sensor data. For example, the network entity may transmit, and a UE may receive, a partition request message corresponding to a hierarchical partitioning scheme. The UE may transmit a partition request feedback message in response to the initial partition request message, which may include an indication of the availability of the UE to act as the lead UE. The UE may receive a partition assignment message from the network entity, which may include a partition between sets of UEs and an indication of the lead UE for the set of UEs.

A method for wireless communications at a first UE is described. The method may include receiving a first indication comprising a request for initiating participation in a hierarchical partitioning-based data-sharing session in which a plurality of UEs are grouped into a plurality of disjoint sets of UEs for sharing raw sensor data, raw measurement data, and feature extraction outputs corresponding to the raw sensor data and the raw measurement data, transmitting a second indication comprising a response message indicating participation in the hierarchical partitioning based data-sharing session, in response to receiving the first indication, and receiving, based at least in part on transmitting the second indication, a third indication comprising a public identifier assigned to a first set of UEs of the plurality of disjoint sets of UEs, wherein the first set of UEs includes the first UE and the public identifier is associated with a lead UE within the first set of UEs.

An apparatus for wireless communications at a first UE is described. The apparatus may include at least one processor, memory coupled with the at least one processor, and instructions stored in the at least one memory. The instructions may be executable by the at least one processor to cause the apparatus to receive a first indication comprising a request for initiating participation in a hierarchical partitioning-based data-sharing session in which a plurality of UEs are grouped into a plurality of disjoint sets of UEs for sharing raw sensor data, raw measurement data, and feature extraction outputs corresponding to the raw sensor data and the raw measurement data, transmit a second indication comprising a response message indicating participation in the hierarchical partitioning based data-sharing session, in response to receiving the first indication, and receive, based at least in part on transmitting the second indication, a third indication comprising a public identifier assigned to a first set of UEs of the plurality of disjoint sets of UEs, wherein the first set of UEs includes the first UE and the public identifier is associated with a lead UE within the first set of UEs.

Another apparatus for wireless communications at a first UE is described. The apparatus may include means for receiving a first indication comprising a request for initiating participation in a hierarchical partitioning-based data-sharing session in which a plurality of UEs are grouped into a plurality of disjoint sets of UEs for sharing raw sensor data, raw measurement data, and feature extraction outputs corresponding to the raw sensor data and the raw measurement data, means for transmitting a second indication comprising a response message indicating participation in the hierarchical partitioning based data-sharing session, in response to receiving the first indication, and means for receiving, based at least in part on transmitting the second indication, a third indication comprising a public identifier assigned to a first set of UEs of the plurality of disjoint sets of UEs, wherein the first set of UEs includes the first UE and the public identifier is associated with a lead UE within the first set of UEs.

A non-transitory computer-readable medium storing code for wireless communications at a first UE is described. The code may include instructions executable by at least one processor to receive a first indication comprising a request for initiating participation in a hierarchical partitioning-based data-sharing session in which a plurality of UEs are grouped into a plurality of disjoint sets of UEs for sharing raw sensor data, raw measurement data, and feature extraction outputs corresponding to the raw sensor data and the raw measurement data, transmit a second indication comprising a response message indicating participation in the hierarchical partitioning based data-sharing session, in response to receiving the first indication, and receive, based at least in part on transmitting the second indication, a third indication comprising a public identifier assigned to a first set of UEs of the plurality of disjoint sets of UEs, wherein the first set of UEs includes the first UE and the public identifier is associated with a lead UE within the first set of UEs.

Some examples of the method, apparatuses, and non-transitory computer-readable medium described herein may further include operations, features, means, or instructions for transmitting a fourth indication to denote an availability of the first UE to act as the lead UE, wherein the fourth indication is multiplexed with, included in, or separate from the second indication, receiving a fifth indication that the first UE may be the lead UE of the first set of UEs, wherein the fifth indication is multiplexed with, included in, or separate from the third indication, and receiving unicast signaling comprising the raw sensor data, the raw measurement data, and local feature data from each respective UE of the first set of UEs based at least in part on a public identifier of the lead UE being the same as the public identifier of the first UE.

Some examples of the method, apparatuses, and non-transitory computer-readable medium described herein may further include operations, features, means, or instructions for transmitting an indication of one or more extracted features associated with combined raw sensor data, raw measurement data, and local feature data to a network entity based at least in part on the first UE receiving the unicast signaling comprising the raw sensor, the raw measurement data, and the local feature data.

Some examples of the method, apparatuses, and non-transitory computer-readable medium described herein may further include operations, features, means, or instructions for receiving the fifth indication that the first UE may be the lead UE may be based at least in part on transmitting the fourth indication that the first UE may be capable of performing as the lead UE.

Some examples of the method, apparatuses, and non-transitory computer-readable medium described herein may further include operations, features, means, or instructions for transmitting one or more parameters comprising location information, a quantity of sensor data generated by the first UE, computation power capability associated with the first UE, or any combination thereof, wherein receiving the fifth indication that the first UE may be the lead UE may be based at least in part on the one or more parameters.

Some examples of the method, apparatuses, and non-transitory computer-readable medium described herein may further include operations, features, means, or instructions for transmitting, to a network entity, partition reporting information comprising one or more of sensor data associated with the first set of UEs, sensor data extraction information associated with the first set of UEs, position information associated with the first UE or the first set of UEs, object occlusion information associated with the first set of UEs, partition cost information for sensor data associated with one or more UEs included in the first set of UEs as well as one or more UEs excluded from the first set of UEs but included in the plurality of disjoint sets of UEs, or any combination thereof and receiving a sixth indication indicating the public identifier of an updated first set of UEs of a plurality of updated disjoint sets of UEs, an updated indication of a new lead UE, or any combination thereof.

Some examples of the method, apparatuses, and non-transitory computer-readable medium described herein may further include operations, features, means, or instructions for calculating a cost value associated with a partition between the first set of UEs and the second set of UEs, the partition cost information being based at least in part on the raw sensor data, the raw measurement data, and local feature data received.

In some examples of the method, apparatuses, and non-transitory computer-readable medium described herein, the partition cost information includes an indication of a decrease in an accuracy level of feature extraction associated with sensor data shared by the first set of UEs with the lead UE based, at least in part, on an absence of the one or more UEs of the second set of UEs from the first set of UEs and receiving the sixth indication may be based at least in part on the partition cost information.

Some examples of the method, apparatuses, and non-transitory computer-readable medium described herein may further include operations, features, means, or instructions for broadcasting an indication of one or more extracted features associated with the raw sensor data and the raw measurement data to a plurality of UEs within and outside the first set of UEs based at least in part on an existing connection for feature data sharing between the first UE and the plurality of UEs.

Some examples of the method, apparatuses, and non-transitory computer-readable medium described herein may further include operations, features, means, or instructions for receiving an indication that a second UE of the first set of UEs may be the lead UE, wherein the indication is multiplexed with, included in, or separate from the third indication, and transmitting unicast signaling comprising the raw sensor data, the raw measurement data, and local feature data from the first UE to the second UE based at least in part on the indication that the second UE may be the lead UE.

Some examples of the method, apparatuses, and non-transitory computer-readable medium described herein may further include operations, features, means, or instructions for receiving, from the second UE based at least in part on transmitting the unicast signaling comprising the raw sensor data, the raw measurement data, and local feature data, a broadcast message comprising one or more extracted features associated with the raw sensor data, the raw measurement data, and the local feature data.

Some examples of the method, apparatuses, and non-transitory computer-readable medium described herein may further include operations, features, means, or instructions for transmitting the raw sensor data, the raw measurement data, an indication of one or more locally extracted features associated with the raw sensor data or the raw measurement data, or any combination thereof, to a network entity.

In some examples of the method, apparatuses, and non-transitory computer-readable medium described herein, the sharing raw sensor data includes sharing radio detection and ranging data, lighting detection and ranging data, camera image data, stereo-vision image data, velocity information, position information, or any combination thereof.

In some examples of the method, apparatuses, and non-transitory computer-readable medium described herein, the sharing raw measurement data includes sharing wireless channel statistics, channel state information, or a combination thereof, of a vehicular UE or a cellular UE paired with the vehicular UE, or any combination thereof.

In some examples of the method, apparatuses, and non-transitory computer-readable medium described herein, the feature extraction outputs include object bounding, objection location estimation, object orientation estimation, object detection, object classification, confidence measurement, mapping, compression of wireless channel information, or any combination thereof, based at least in part on aggregated sensor data, wireless data, and raw data.

A method for wireless communications at a network entity is described. The method may include transmitting, to a plurality of user equipments (UEs), a first indication comprising a request for initiating participation in a hierarchical partitioning-based data-sharing session in which a plurality of UEs are grouped into a plurality of disjoint sets of UEs for sharing raw sensor data, raw measurement data, and feature extraction outputs corresponding to the raw sensor data and the raw measurement data, receiving a second indication comprising a response message indicating participation in the hierarchical partitioning-based data-sharing session, in response to transmitting the first indication, and transmitting, to the plurality of UEs based at least in part on receiving the second indication, a third indication comprising a public identifier assigned to a first set of UEs of the plurality of disjoint sets of UEs, wherein the first set of UEs includes the first UE and the public identifier is associated with a lead UE within the first set of UEs.

An apparatus for wireless communications at a network entity is described. The apparatus may include at least one processor, memory coupled with the at least one processor, and instructions stored in the at least one memory. The instructions may be executable by the at least one processor to cause the apparatus to transmit, to a plurality of user equipments (UEs), a first indication comprising a request for initiating participation in a hierarchical partitioning-based data-sharing session in which a plurality of UEs are grouped into a plurality of disjoint sets of UEs for sharing raw sensor data, raw measurement data, and feature extraction outputs corresponding to the raw sensor data and the raw measurement data, receive a second indication comprising a response message indicating participation in the hierarchical partitioning-based data-sharing session, in response to transmitting the first indication, and transmit, to the plurality of UEs based at least in part on receiving the second indication, a third indication comprising a public identifier assigned to a first set of UEs of the plurality of disjoint sets of UEs, wherein the first set of UEs includes the first UE and the public identifier is associated with a lead UE within the first set of UEs.

Another apparatus for wireless communications at a network entity is described. The apparatus may include means for transmitting, to a plurality of user equipments (UEs), a first indication comprising a request for initiating participation in a hierarchical partitioning-based data-sharing session in which a plurality of UEs are grouped into a plurality of disjoint sets of UEs for sharing raw sensor data, raw measurement data, and feature extraction outputs corresponding to the raw sensor data and the raw measurement data, means for receiving a second indication comprising a response message indicating participation in the hierarchical partitioning-based data-sharing session, in response to transmitting the first indication, and means for transmitting, to the plurality of UEs based at least in part on receiving the second indication, a third indication comprising a public identifier assigned to a first set of UEs of the plurality of disjoint sets of UEs, wherein the first set of UEs includes the first UE and the public identifier is associated with a lead UE within the first set of UEs.

A non-transitory computer-readable medium storing code for wireless communications at a network entity is described. The code may include instructions executable by at least one processor to transmit, to a plurality of user equipments (UEs), a first indication comprising a request for initiating participation in a hierarchical partitioning-based data-sharing session in which a plurality of UEs are grouped into a plurality of disjoint sets of UEs for sharing raw sensor data, raw measurement data, and feature extraction outputs corresponding to the raw sensor data and the raw measurement data, receive a second indication comprising a response message indicating participation in the hierarchical partitioning-based data-sharing session, in response to transmitting the first indication, and transmit, to the plurality of UEs based at least in part on receiving the second indication, a third indication comprising a public identifier assigned to a first set of UEs of the plurality of disjoint sets of UEs, wherein the first set of UEs includes the first UE and the public identifier is associated with a lead UE within the first set of UEs.

Some examples of the method, apparatuses, and non-transitory computer-readable medium described herein may further include operations, features, means, or instructions for receiving a fourth indication to denote an availability of the first UE to act as the lead UE, wherein the fourth indication is multiplexed with, included in, or separate from the second indication, transmitting a fifth indication that the first UE may be the lead UE of the first set of UEs, wherein the fifth indication is multiplexed with, included in, or separate from the third indication, and receiving an indication of one or more extracted features associated with combined sensor and data and the raw measurement data from each lead UE of the plurality of disjoint sets of UEs based at least in part on each lead UE receiving unicast signaling comprising the raw sensor data, raw measurement data, and locally local feature data from each respective UE of each disjoin set of UEs of the plurality of disjoint sets of UEs.

Some examples of the method, apparatuses, and non-transitory computer-readable medium described herein may further include operations, features, means, or instructions for transmitting the fifth indication that the first UE may be the lead UE may be based at least in part on receiving the indication that the first UE may be capable of performing as the lead UE.

Some examples of the method, apparatuses, and non-transitory computer-readable medium described herein may further include operations, features, means, or instructions for receiving one or more parameters comprising location information, a quantity of sensor data generated by the first UE, computation power capability associated with the first UE, or any combination thereof, wherein receiving the indication that the first UE may be the lead UE may be based at least in part on the one or more parameters.

Some examples of the method, apparatuses, and non-transitory computer-readable medium described herein may further include operations, features, means, or instructions for receiving, from one or more UEs of the first set of UEs, partition reporting information comprising one or more of the raw sensor data and the raw measurement data associated with the first set of UEs, sensor data extraction information associated with the first set of UEs, position information associated with the first UE or the first set of UEs, object occlusion information associated with the first set of UEs, partition cost information for sensor data associated with one or more UEs of a second set of UEs of the plurality of disjoint sets of UEs, or any combination thereof and transmitting, to the first set of UEs, the second set of UEs, or both, a sixth indication indicating the public identifier of an updated first set of UEs of a plurality of updated disjoint sets of UEs, an updated indication of a new lead UE, or any combination thereof.

In some examples of the method, apparatuses, and non-transitory computer-readable medium described herein, the partition cost information includes a cost value associated with a partition between the first set of UEs and the second set of UEs.

In some examples of the method, apparatuses, and non-transitory computer-readable medium described herein, the partition cost information includes an indication of a decrease in an accuracy level of feature extraction associated with sensor data shared by the first set of UEs with the lead UE based at least in part on an absence of the one or more UEs of the second set of UEs from the first set of UEs and transmitting the sixth indication may be based at least in part on the partition cost information.

In some examples of the method, apparatuses, and non-transitory computer-readable medium described herein, the sharing raw sensor data includes sharing radio detection and ranging data, lighting detection and ranging data, camera image data, stereo-vision image data, velocity information, position information, or any combination thereof.

In some examples of the method, apparatuses, and non-transitory computer-readable medium described herein, the sharing raw measurement data includes sharing wireless channel statistics, channel state information, or a combination thereof, of a vehicular UE or a cellular UE paired with the vehicular UE, or any combination thereof.

In some examples of the method, apparatuses, and non-transitory computer-readable medium described herein, the feature extraction outputs include object bounding, objection location estimation, object orientation estimation, object detection, object classification, confidence measurement, mapping, compression of wireless channel information, or any combination thereof, based at least in part on aggregated sensor data, wireless data, and raw data.

DETAILED DESCRIPTION

Figure 1:
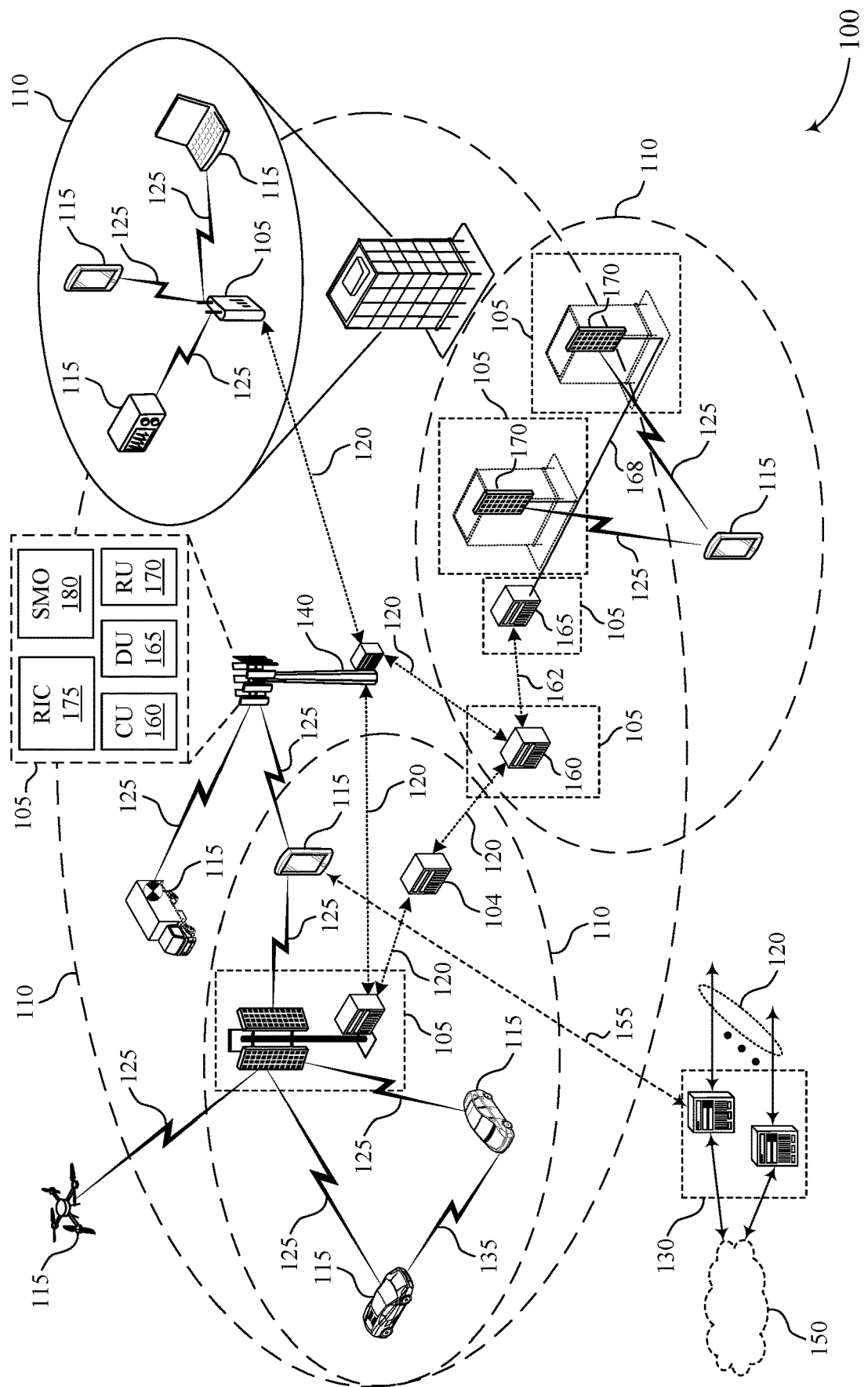
FIG. 1 shows an example of a wireless communications system that supports hierarchical partitioning and sensor data aggregation in perceptive wireless communications systems in accordance with one or more aspects of the present disclosure.

In some wireless communications systems, wireless devices may be assisted by the perception of the physical environment. For example, in a perceptive wireless communication system, perception may include raw measurement data and machine learning (ML) feature data gathered from vehicular sensors, which may be used to improve the quality or effectiveness of various wireless communications tasks. Communications tasks that may benefit from perception may include beam management, beam blockage prediction, beam refinement, or other tasks.

A user equipment (UE) may generate raw sensor data and perform feature extraction. If the objects or environment detected by the UE are occluded, the UE may not be able to effectively perform feature extraction. For example, a bounding box is a shape (e.g., a rectangle) that surrounds an object (e.g., on a camera image) and may specify the object's position, class (e.g., pedestrian or vehicle), and confidence (e.g., how likely the object is to be located within the bounding box). In some examples, a bounding box for a detected object may be a smaller, partial bounding box resulting from an occluded field-of-view (FoV) at the sensor. In some examples, multiple UEs may share and aggregate extracted features to improve or refine the quality and/or efficiency of the communications system. However, if the UEs share incorrect features (e.g., a set of partial bounding boxes whose union only surrounds part of an object), extracted feature aggregation may fail. For example, two UEs may extract a partial bounding box for the same occluded object, but the bounding boxes may not be recognized as belonging to the same object during feature aggregation due to the occlusion. Moreover, efforts to improve feature aggregation by transmitting raw sensor data in addition to the extracted features to multiple neighboring UEs that are sensing/measuring the same target may result in large sidelink signaling overheads, while aggregation of extracted features or raw data at the network may result in large uplink signaling overhead.

A network entity may partition one or more UEs within a target area into groups (e.g., disjoint sets or partitions) and assign one UE per set to be a lead UE to aggregate shared sensor data and reduce signaling overhead. For example, the network entity may transmit, and a UE may receive, a partition request message corresponding to a hierarchical partitioning scheme. The UE may transmit a partition request feedback message in response to the initial partition request message, which may include an indication of the availability of the UE to act as the lead UE. The UE may receive a partition assignment message from the network entity, which may include one or more of an indication of the UE being placed in the n-th partition, an identifier of the n-th partition, an indication of the UEs placed in the n-th partition (wherein n≤m and m=1, 2, . . . ), and an indication of the lead UE for the set of UEs in the n-th partition. For example, a UE may receive an indication that it may act as the lead UE, or the UE may receive an indication that a different UE may act as the lead UE. The UEs assigned to a partition may transmit raw sensor data, raw measurement data, and feature extraction outputs corresponding to the raw sensor data and the raw measurement data to the lead UE for that partition.

Aspects of the disclosure are initially described in the context of wireless communications systems. Aspects of the disclosure are further illustrated by and described with reference to wireless communications systems, hierarchical portioning schemes, and process flows. Aspects of the disclosure are further illustrated by and described with reference to apparatus diagrams, system diagrams, and flowcharts that relate to hierarchical partitioning and sensor data aggregation in perceptive wireless communications systems.

FIG. 1 shows an example of a wireless communications system 100 that supports hierarchical partitioning and sensor data aggregation in perceptive wireless communications systems in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support hierarchical partitioning and sensor data aggregation in perceptive wireless communications systems as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

The time intervals for the network entities 105 or the UEs 115 may be expressed in multiples of a basic time unit which may, for example, refer to a sampling period of $T_s = 1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a network entity 105 (e.g., a base station 140) without human intervention. In some examples, M2M communication or MTC may include communications from devices that integrate sensors or meters to measure or capture information and relay such information to a central server or application program that uses the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

In some systems, a D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., network entities 105, base stations 140, RUs 170) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity may partition one or more UEs 115 within a target area into groups (e.g., disjoint sets or partitions) and assign one UE 115 per set to be a lead UE 115 to aggregate shared sensor data and reduce signaling overhead. For example, the network entity may transmit, and a UE 115 may receive, a partition request message corresponding to a hierarchical partitioning scheme. The UE 115 may transmit a partition request feedback message in response to the initial partition request message, which may include an indication of the availability of the UE 115 to act as the lead UE 115. The UE 115 may receive a partition assignment message from the network entity, which may include a partition between a first set of UEs 115 and a second set of UEs 115 (e.g., an indication of one or more groups of UEs 115) and an indication of the lead UE 115 for the set of UEs 115. For example, a UE 115 may receive an indication that it may act as the lead UE, or the UE may receive an indication that a different UE 115 may act as the lead UE 115.

Figure 2:
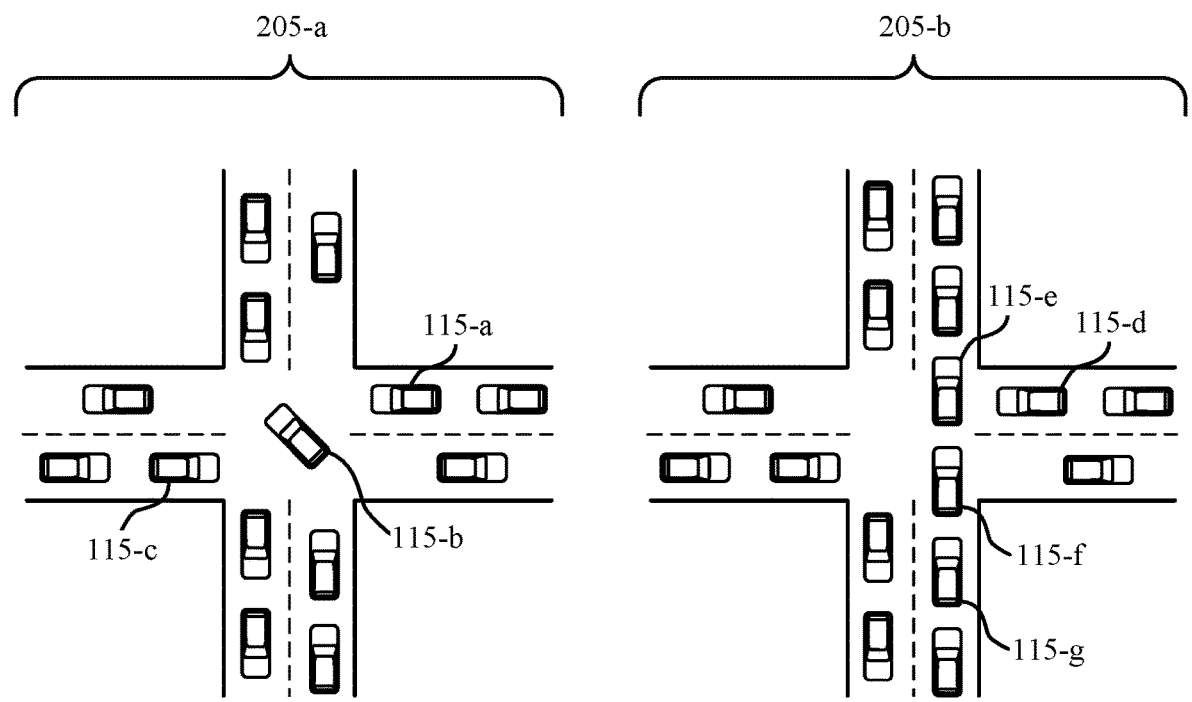
FIG. 2 shows an example of a wireless communications system that supports hierarchical partitioning and sensor data aggregation in perceptive wireless communications systems in accordance with one or more aspects of the present disclosure.

FIG. 2 shows an example of a wireless communications system 200 that supports hierarchical partitioning and sensor data aggregation in perceptive wireless communications systems in accordance with one or more aspects of the present disclosure. The wireless communications system 200 includes UEs 115-a, 115-b, 115-c, 115-d, 115-e, 115-f, and 115-g, which may be examples of UEs 115 as described with reference to FIG. 1. Although illustrated with reference to vehicular UEs, the UEs 115 may be examples of any type of UE.

Some communications systems, such as communications system 200, may support techniques including perception of a physical environment. For example, in a perceptive wireless communications system, perception may consist of measurement data and ML feature data gathered from vehicular sensors (e.g., RADAR, LiDAR, cameras, GNSS, or IMU sensors). For example, a UE 115 supporting perceptive wireless communication may use one or more sensors (e.g., RADAR, LiDAR, cameras, etc.) to generate additional information about a physical environment, such as blockages, traffic patterns, pending accidents or the like. For instance, the UE 115-a may use various types of sensors to determine a location of one or more additional UEs located within the physical environment of the UE 115-a, or may detect a pedestrian or accident in front of the vehicle. In some examples, such information may be used to improve the quality or effectiveness of various wireless communications tasks. Communications tasks that may benefit from perception may include beam management, beam blockage prediction, beam refinement, or other tasks. For instance, by detecting the location of one or more additional UEs, the UE 115-a may predict beam blockages (e.g., by the additional UEs, or by other detected obstructions), and may improve beam refinement or beam management procedures, among other examples.

In a wireless perceptive communications system, a UE 115 may generate raw sensor data and perform feature extraction. Raw sensing data or measurements may include RADAR point clouds, LiDAR points clouds, camera images, stereo-vision images, velocity and heading information, and other data collected from sensors. Feature extraction involves reducing a large amount of raw data into condensed descriptions of the raw data. For example, extracted features may include compressed wireless channel features, indications of detected objects and classification of detected objects (e.g., identifying another UE 115 or a pedestrian in camera data), bounding boxes around detected objects (e.g., a box that surrounds another UE 115 or a pedestrian in camera data), object location and orientation estimates, a confidence measure (e.g., a confidence value or a confidence score) attributed to bounding boxes, 3 dimensional (3-D) or depth maps, among other possible features. In some examples, feature extraction may be performed by a ML or non-ML algorithm. In a wireless perceptive communications system, a UE 115 or a network entity 105 may combine sensing-related measurement data (e.g., raw sensing data) and local feature data from one or more vehicles with communications-related measurements and related feature data from cellular devices (e.g., UEs 115) to improve and refine the quality and efficiency of the communications system.

In some examples, perception may involve multiple sensors observing the same vehicle or object, resulting in multiple inter-related measurements and multiple inter-related features extracted from these measurements. These inter-related measurements and features may be distributed across multiple vehicles. For example, in traffic scenario 205-a, the UE 115-b may be sensed by the UE 115-a and the UE 115-c.

In some examples, objects sensed by a UE 115 may be occluded. For example, in traffic scenario 205-a, the UE 115-c may be occluded for the UE 115-a by the UE 115-b. In such examples, the UE 115-a may not be able to effectively sense dimensions, orientation, heading, or other information regarding other UEs 115, such as the UE 115-c which is occluded from the UE 115-a by the UE 115-b. In another example, in traffic scenario 205-b, one or more UEs 115 (e.g., experiencing standstill traffic and located close to each other) may occlude a sensing capacity for other UEs 115. For instance, the UE 115-e may occlude the forward vision or sensing capacity of both UE 115-d and UE 115-f, while the UE 115-g may occlude the rear vision or sensing capacity of the UE 115-f. That is, due to backed up traffic, the UE 115-f may be located so close to the UE 115-e and the UE 115-g, that the UE 115-f may not accurately sense or detect aspects of the physical environment. For instance, a camera at UE 115-f may be near enough to the UE 115-e that the UE 115-e occludes the field of vision of the camera at UE 115-f. In that case, the UE 115-f may also fail to identify the UE 115-e as a vehicle because the camera on the UE 115-f is too close to the UE 115-e and the camera can only observe a small fraction of the vehicle. In other words, the UE 115-f may incorrectly extract features (e.g., a bounding box or an object classification) due to sensor occlusion.

To overcome inaccurate sensing data and extracted features, a network entity 105 may adjust operational parameters for one or more sensors (e.g., FoV, range, or resolution). However, these parameter adjustments will not overcome deficiencies caused by sensor occlusion. If the objects/environment detected by the UE are occluded, the UE may not be able to effectively perform feature extraction. For example, the bounding box for a detected object may be too small. In some examples, multiple UEs may share/aggregate extracted features to improve or refine the quality and/or efficiency of the communications system. However, if the UEs share incorrect features (e.g., a set of partial bounding boxes whose union only surrounds part of an object), extracted feature aggregation may fail. For example, in traffic scenario 205-a, the UE 115-a and the UE 115-b may sense the UE 115-c, although the UE 115-c is occluded for the UE 115-a. The UE 115-a and the UE 115-b may extract and share their respective partial bounding boxes for the UE 115-c, but the bounding boxes may not be recognized as belonging to the same object during feature aggregation.

An object may be accurately observed by combining the measurements or raw sensor data of multiple vehicular sensors in the proximity of the object. However, multicasting all raw sensor data and extracted features may result in large sidelink signaling overhead, while aggregation of extracted features or raw data at the network may result in large uplink signaling overhead. Therefore, it may be advantageous to identify an optimal partition or grouping of vehicles (e.g., UEs 115) whose inter-related raw sensing data and feature extraction data may be combined to increase the accuracy of aggregated feature extraction. The aggregated extracted features may represent a smaller quantity of data to be transmitted, for example, to a network entity 105 compared to the raw sensing data and measurements.

The present disclosure describes a method to locally aggregate raw sensing data pertaining to partial measurements from vehicular sensors, optimally and with the least overhead. The UEs 115 in a target area may be partitioned into groups, and each group may be assigned one lead UE 115. The lead UE 115 may receive the raw sensing data for each UE in the group and may aggregate the data and perform feature extraction on the aggregated data. The lead UE 115 may also aggregate and utilize any features extracted and transmitted by individual UEs 115 within the group as well as by any UEs 115 that are already sharing their extracted features but not raw data with the lead UE outside the group. The lead UE 115 may broadcast aggregated feature results to the UEs 115 within the group and to the network entity 105. Aggregating data at a local lead UE rather than at a network entity 105 may reduce demand on uplink capacity and place a smaller overhead on V2V links.

Identifying the optimal partitions or groupings of vehicles whose inter-related raw sensing data and feature extraction data can be combined to increase the accuracy of feature extraction is a combinatorial problem (i.e., there is a finite collection of objects and a set of constraints, such that an object must be found that satisfies all constraints). Such a problem may be solved by employing iterative algorithms (e.g., simulated annealing or other ML-based improvement algorithms).

In V2V sensor sharing, the UEs 115 within a group may broadcast features extracted from individual sensing measurements. The accuracy of feature extraction may be improved by employing feature aggregation. For example, cooperative driving using V2V sensor sharing utilizes V2V sharing of state information such as location and velocity to coordinate driving behaviors of a group of vehicles. V2V high-definition sensor sharing for mmWave considers a situation in which the vehicles are sharing raw sensing data as well as feature data to offset the negative effects of occlusion. However, in previous methods, the raw sensing data is multicast to more than one vehicular UE 115, creating a large sidelink overhead. The methods proposed in this disclosure strategically group vehicular UEs 115 and aggregate raw sensing and channel data at one lead UE per group. Thus, overhead is decreased, and feature extraction output is more reliable and smaller in size than the raw sensing data. The lead UE 115 can broadcast the relatively small, aggregated features to all UEs 115 in the group.

Figure 3:
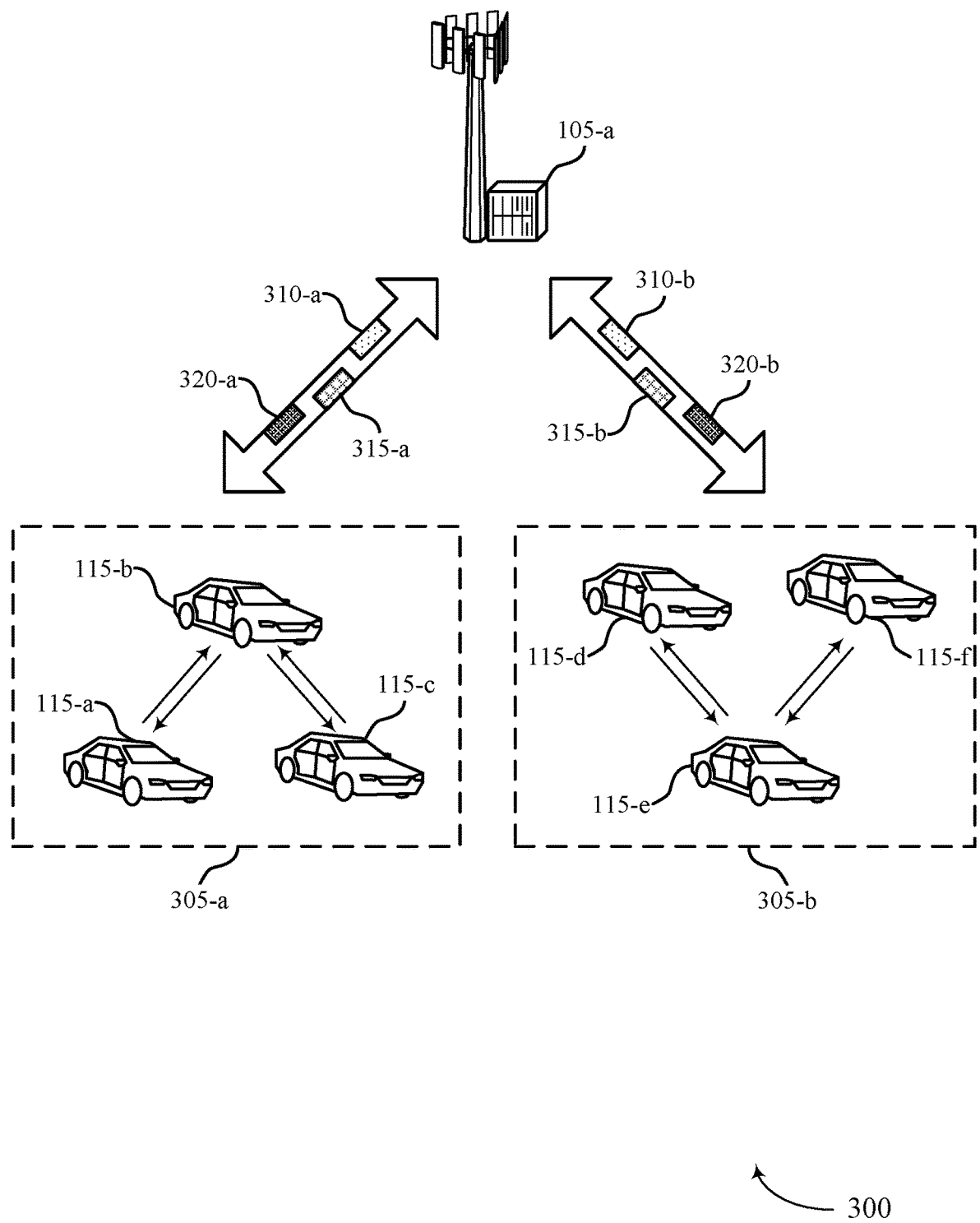
FIG. 3 shows an example of a wireless communications system 300 that supports hierarchical partitioning and sensor data aggregation in perceptive wireless communications systems in accordance with one or more aspects of the present disclosure.

FIG. 3 shows an example of a communications system 300 that supports hierarchical partitioning and sensor data aggregation in perceptive wireless communications systems in accordance with one or more aspects of the present disclosure. The wireless communications system 300 includes network entity 105-a, UE 115-a, UE 115-b, UE 115-c, UE 115-d, UE 115-e, and UE 115-f, which may be examples of the network entities 105 and UEs 115 as described with reference to FIG. 1.

A UE 115 (e.g., the UE 115-b) may transmit, and a network entity 105-a may receive, a request to establish a sensing-based ML service session. The network entity 105-a may transmit, and the UE 115-b may receive, an acknowledgment of the request to establish the ML service session and a request to provide information on the vehicular sensors, vehicular sensor capabilities, onboard processor capabilities, and ML model capabilities. The UE 115-b may transmit, and the network entity 105-a may receive, the requested information on the vehicular sensors, vehicular sensor capabilities, onboard processor capabilities, and ML model capabilities. The network entity 105-a may transmit, and the UE 115-b may receive, a first configuration of the sensors and sensor properties (e.g., range or FoV), the ML models, and the ML model weights.

Upon establishing a ML service session, the UE 115-b may transmit, and the network entity 105-a may receive, a first set of data elements, which may include features extracted from the raw data using the ML feature extraction models. Based on the feedback from the ML service entity, the network entity 105-a may transmit, and the UE 115-b may receive, a first gradient update to the ML models, reconfiguration of sensor properties, and a first request for hierarchical partitioning of UEs.

As part of the first request for hierarchical partitioning of UEs, the network entity 105-a may transmit, and the UE 115-b may receive, a first indication including a partition request message 310-a (e.g., a hierarchical data session request) that may initiate participation in a hierarchical partitioning-based data-sharing session. The UE 115-b may transmit a second indication including a partition request response message 315-a, indicating that the UE 115-b may participate in the hierarchical partitioning-based data-sharing session. The partition request response message 315-a may also include an indication of a capacity or availability for the UE 115-b to act as a lead UE for a partition or group.

The network entity 105-a may transmit, and the UE 115-b may receive, a third indication including a partition assignment message 320-a. The partition assignment message 320-a may include a first identifier for the partition or group to which the UE 115-b may be assigned (e.g., an index of the partition). In some examples, the first identifier may be a private identifier or a public identifier. For example, the partition assignment message 320-a may assign the UE 115-b to the partition 305-a, together with UE 115-a and UE 115-c. The partition assignment message 320-a may also include a second identifier associated with a lead UE for the assigned partition. In some examples, the second identifier may be a private identifier of the lead UE, or a private, hierarchical partitioning session-specific identifier of the lead UE. In some examples, the second identifier may be a public identifier of the lead UE. For example, the UE 115-b may receive an indication that it is to be the lead UE for partition 305-a. The lead UE 115-b may receive and aggregate sensing data and extracted features from the non-lead UEs within partition 305-a (e.g., UE 115-a and UE 115-b). The lead UE 115-b may extract features from the aggregated sensing data and transmit the extracted features to the network entity 105-a, the non-lead UEs 115-a and 115-b, or both. In some examples, a single public identifier may be included in the partition message 320-a (e.g., the first identifier or the second identifier, or a single public identifier for the lead UE that can be interpreted as a UE identifier or a public identifier for the partition corresponding to the lead UE). In some examples, the partition message 320-a may include both the first public identifier and the second public identifier.

In some examples, the lead UE 115-b may transmit, and the network entity 105-a may receive, a cost inferred due to participation in partition 305-a, different from the partition of adjacent UEs 115 (e.g., UE 115-d in partition 305-b). The lead UE 115-b may also transmit, and the network entity 105-a may receive, a gain inferred due to combining raw sensing data from the non-lead UEs 115 in the partition 305-a and any feature data received from the non-lead UEs 115 in any partition 305, as opposed to aggregation of feature data received from any of the partitions 305. The cost and/or the gain may be inferred or calculated via ML model weights received from the network entity 105-a.

A similar process may take place for the UE 115-d. The UE 115-d may transmit, and a network entity 105-a may receive, a request to establish a sensing-based ML service session. The network entity 105-a may transmit, and the UE 115-d may receive, an acknowledgment of the request to establish the ML service session and a request to provide information on the vehicular sensors, vehicular sensor capabilities, onboard processor capabilities, and ML model capabilities. The UE 115-d may transmit, and the network entity 105-a may receive, the requested information on the vehicular sensors, vehicular sensor capabilities, onboard processor capabilities, and ML model capabilities. The network entity 105-a may transmit, and the UE 115-d may receive, a first configuration of the sensors and sensor properties (e.g., range or FoV), the ML models, and the ML model weights.

Upon establishing a ML service session, the UE 115-d may transmit, and the network entity 105-a may receive, a first set of data elements, which may include features extracted from the raw data using the ML feature extraction models. Based on the feedback from the ML service entity, the network entity 105-a may transmit, and the UE 115-d may receive, a first gradient update to the ML models, reconfiguration of sensor properties, and a first request for hierarchical partitioning of UEs.

As part of the first request for hierarchical partitioning of UEs, the network entity 105-a may transmit, and the UE 115-d may receive, a first indication including a partition request message 310-b (e.g., a hierarchical data session request) that may initiate participation in a hierarchical partitioning-based data-sharing session. The UE 115-d may transmit a second indication including a partition request response message 315-b, indicating that the UE 115-d may participate in the hierarchical partitioning-based data-sharing session. The partition request response message 315-b may also include an indication of a capacity or availability for the UE 115-b to act as a lead UE for a partition or group (or lack thereof).

The network entity 105-a may transmit, and the UE 115-d may receive, a third indication including a partition assignment message 320-b. The partition assignment message 320-b may include a first identifier (e.g., a public identifier) for the partition or group to which the UE 115-d may be assigned. For example, the partition assignment message 320-b may assign the UE 115-d to the partition 305-b, together with UE 115-e and UE 115-f. The partition assignment message 320-b may also include a second identifier (e.g., a public identifier, a private identifier, or a hierarchical partitioning session-specific identifier) associated with a lead UE for the assigned partition. For example, The UE 115-d may receive an indication that the UE 115-e is to be the lead UE for partition 305-b. The non-lead UE 115-d may transmit sensing data and extracted features to the lead UE 115-e. In some examples, the non-lead UE 115-d may receive aggregated features from the aggregated sensing data from the lead UE 115-e.

In some examples, the non-lead UE 115-d (or the lead UE 115-e, or both) may transmit, and the network entity 105-a may receive, a cost inferred due to participation in partition 305-b, different from the partition of adjacent UEs 115 (e.g., UE 115-c in partition 305-a). The cost may be inferred or calculated via ML model weights received from the network entity 105-a.

The network entity 105-a may change the partition assignments across multiple iterations over time to determine an optimal partitioning of vehicular UEs 115. For example, the network entity 105-a may use the feature accuracy costs and gains associated with the partition assignments of a first iteration received from the lead UEs 115 to update partition assignments in a second iteration. This iterative hierarchical partitioning process is described in more detail with respect to FIG. 4.

Figure 4:
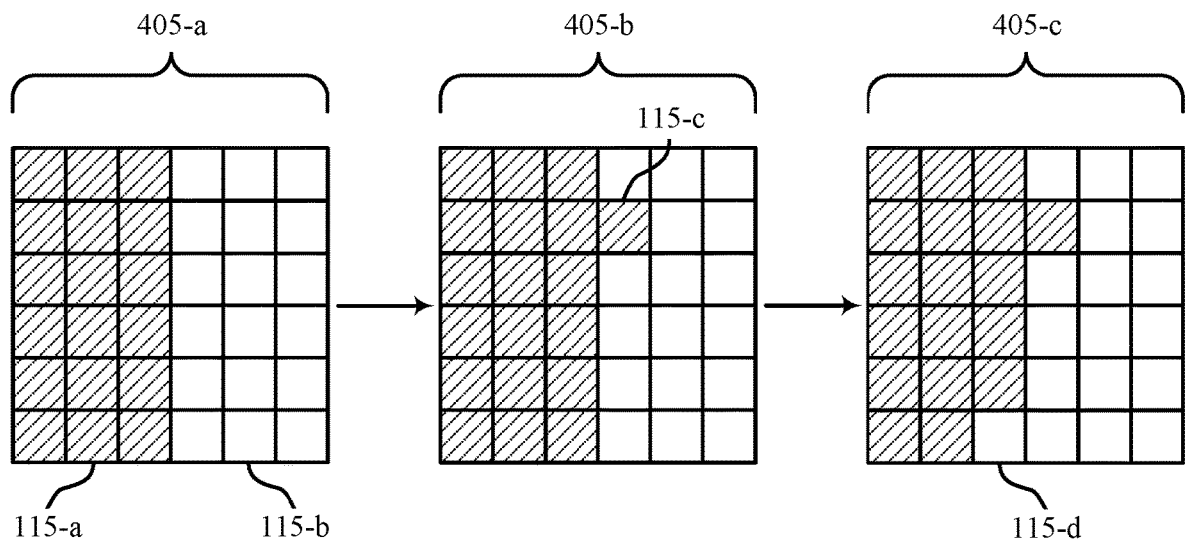
FIG. 4 shows an example of a hierarchical partitioning scheme that supports hierarchical partitioning and sensor data aggregation in perceptive wireless communications systems in accordance with one or more aspects of the present disclosure.
Figure 4:
Figure 4:

FIG. 4 shows an example of a hierarchical partitioning scheme 400 that supports hierarchical partitioning and sensor data aggregation in perceptive wireless communications systems in accordance with one or more aspects of the present disclosure. As described with reference to FIG. 3, a network entity 105 may update partition assignments (including the indication of the lead UE for a partition group) across multiple iterations 405 over time. The partition assignment updates may be based on extracted feature accuracy costs and gains received from lead UEs 115 (or received from the non-lead UEs 115, or both). In any iteration 405, the UEs 115 that belong to a partition group 1, but have established V2V sensor sharing connections with UEs that belong to another partition 2 will benefit from the extracted features but not the raw sensing data of the UEs in partition 2. The network entity 105 may iterate partition assignments to decrease the cost of refraining from sharing raw sensing data for each partition, while the feature extraction data remains free to share.

For example, a target area may be considered as a graph $\mathcal{G} = (\mathcal{V},, \varepsilon)$ with vehicles as nodes in the set $\mathcal{V},$, and vehicles visible to each other may be connected by edges represented by the set $\varepsilon$. The graph $\mathcal{G}$ (e.g., target area and UEs therein) may be partitioned into a bipartite or n-partite graph to minimize impact of occlusion according to techniques described herein. Partitions and participants in each partition may be iteratively updated as described herein. In a first iteration 405-a, some UEs 115 (e.g., UE 115-a) may be assigned to partition group 1, while other UEs (e.g., UE 115-b) may be assigned to partition group 2. In a second iteration 405-b (e.g., after a network entity 105 has updated partition assignments), a UE 115-c may be assigned to switch from partition group 2 to partition group 1. In a third iteration 405-c (e.g., after a network entity 105 has updated partition assignments), a UE 115-d may be assigned to switch from partition group 1 to partition group 2.

In some cases, an updated partition assignment may change the indicated lead UE for a partition group. For example, the UE 115-a may be assigned as a lead UE for partition group 1 in iteration 405-a, and assigned as a non-lead UE for partition group 1 in iteration 405-b. In another example, the UE 115-c may be the lead UE for partition group 2 in iteration 405-a. The network entity 105 may update the partition assignment in iteration 405-b by assigning the UE 115-c to the partition group 1 represented by the graph $\mathcal{G}_1 = (\mathcal{V}_1, \varepsilon_1)$ where $\mathcal{V}_1 \subset \mathcal{V}$. In that same iteration 405-b, the network entity 105 must also assign a different UE 115 to be the lead UE 115 for the partition group 2 represented by the graph $\mathcal{G}_2 = (\mathcal{V}_2, \varepsilon_1)$ where $\mathcal{V}_2 \subset \mathcal{V} \dagger \mathcal{V}_1 \subset \mathcal{V}$, since the UE 115-c cannot be the lead UE for a partition group to which it is not assigned.

Thus, as described herein, a central entity (e.g., network entity 105 or server) may attempt to arrive at a partition where a cost of not sharing raw sensing data is decreased for either partition, while the feature extraction data remains free to share.

Figure 5:
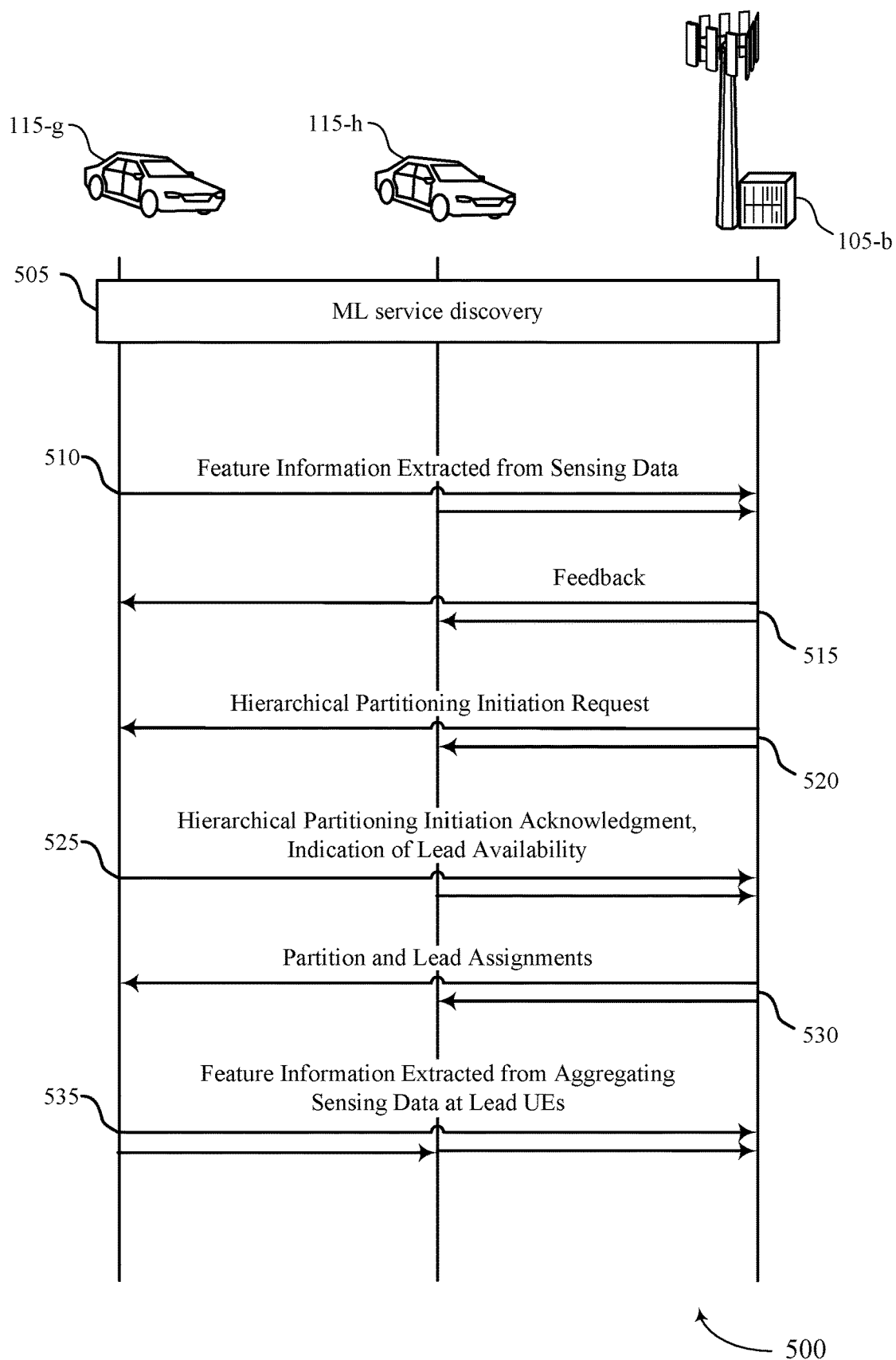
FIG. 5 shows an example of a process flow that supports hierarchical partitioning and sensor data aggregation in perceptive wireless communications systems in accordance with one or more aspects of the present disclosure.

FIG. 5 shows an example of a process flow 500 that supports hierarchical partitioning and sensor data aggregation in perceptive wireless communications systems in accordance with one or more aspects of the present disclosure.

Process flow 500 may implement aspects of, or be implemented by aspects of, FIGS. 1-4. The process flow 500 may include a network entity 105-b, a UE 115-g, and a UE 115-h, which may be example of corresponding devices described with reference to FIGS. 1-4.

The UEs 115 may experience sensor occlusion, as described in greater detail with reference to FIG. 2, resulting in incomplete raw sensing data being available at individual vehicular UEs 115, which may lead to poor feature extraction and poor feature aggregation of features extracted by individual UEs 115. As described herein, the UEs 115 and the network entity 105-b may perform hierarchical partitioning of participating UEs 115, which may facilitate effective aggregation of raw sensing data at one or more lead UEs by means of unicast signaling over sidelink. At the cost of a smaller overhead), the aggregated raw data, as described herein, may result in better feature extraction outputs.

At 505, one or more UEs 115 (e.g., the UE 115-b, and the UE 115-b, among other UEs 115) may perform an ML service discovery procedure. For example, each UE 115 may transmit a registration request. The network entity 105-b may transmit a registration acknowledgment (ACK) or UE sensor and ML model information inquiry. The UEs 115 may transmit a UE sensor and ML model information, among other examples, to the network entity 105-b, and the network entity 105-b may transmit an ML service request. The UEs 115 may transmit responsive ML session requests, and the network entity 105-b may transmit an ML service ACK (e.g., and may perform training, inference, or performance improvement).

After performing ML service discovery at 505, the UEs 115 and the network entity 105-b may perform joint training and inference or performance improvement for ML models as described herein. For example, having initiated an ML service session, the UEs 115 may implement a training and inference feature extraction model. At 510, the UEs 115 (e.g., the UE 115-g and the UE 115-h) may transmit feature information extracted from sensing data to the network entity 105-b. The extracted features may include compressed wireless channel features, indications of detected objects and classification of detected objects (e.g., identifying another UE 115 or a pedestrian in camera data), bounding boxes around detected objects (e.g., a box that surrounds another UE 115 or a pedestrian in camera data), object location and orientation estimates, a confidence measure (e.g., a confidence value or a confidence score) attributed to bounding boxes, 3 dimensional (3-D) or depth maps, among other possible features.

At 515, the network entity 105-b may transmit, to the UEs 115, feedback signaling (e.g., responsive to the sensing information). The network entity 105-b may also transmit gradient information at an aggregated level. The UEs 115 may continue back propagation and may adaptively adjust sensing or feature extraction models, or may initiate hierarchical partitioning based on feedback and sensor occlusion. For example, the UE 115-g may detect occlusion, a quantity of failed feature extractions, a quality or quantity of raw sensor data or feature extraction failing to satisfy a threshold, or the like. In some examples, the UE 115-g may report such detections to the network entity 105-b, resulting in initiation of hierarchical partitioning as described herein, or may autonomously initiation hierarchical partitioning as described herein.

At 520, the network entity 105-b may transmit, to the UEs 115, a request message (e.g., which may be referred to as a hierarchical partitioning initiation request). The hierarchical partitioning request message (e.g., a first indication) may initiate the hierarchical partitioning for the UEs 115. The hierarchical partitioning request message may include a request to initiate participation in the hierarchical partitioning-based data-sharing session. The hierarchical partitioning may include grouping UEs into disjoint sets (e.g., partitions) of UEs for sharing raw sensor data, raw measurement data, feature extraction outputs corresponding to the raw measurement data, raw sensor data, or both.

At 525, the UEs 115 may transmit a hierarchical partitioning initiation ACK message (e.g., a second indication), which may include an indication of a lead availability. For example, the UE 115-g may indicate that the UE 115-g is not capable of supporting the role of lead UE 115 of a partition of UEs (e.g., as described with reference to FIG. 3), or may refrain from including a positive indication that the UE 115-g is capable of being the lead UE 115, while the UE 115-h may indicate that the UE 115-h is capable of supporting the role of lead UE 115 of the partition of UEs. In some examples, the indication that the UE is capable of being the lead UE 115 may include one or more parameters, such as location information, a quantity of sensor data (e.g., the UE 115 with the most data for transmission may be the lead UE 115 to conserve signaling overhead), computation power capability, or any combination thereof.

The network entity 105-*b* may initiate iterative partitioning of UEs 115 and iterative assignments of lead UEs 115. For example, at 530, the network entity 105-*b* may transmit a message including partition information and lead assignment information. The message (e.g., the third indication) including the partition information may include an identifier assigned to a first set of UEs 115 (e.g., the UE 115-*g* and the UE 115-*h*). In some examples, the identifier may be a private identifier of the lead UE, or a private, hierarchical partitioning session-specific identifier of the lead UE. In some examples, the identifier may be a public identifier of the lead UE. The identifier may correspond to one of the UEs 115 in the partition (e.g., the UE 115-*h*), which may identify the UE 115-*h* as the lead UE 115 of the disjoint set of UEs 115 (e.g., the partition).

At 535, the UEs 115 may transmit feature information extracted from aggregating sensing data at the lead UEs 115. The feature information may include adjusted data, extracted features, and other information. In some examples, the lead UE 115-*h* may receive unicast signaling including raw sensor data, raw measurement data, local feature data extracted from an individual UE's data (i.e., local extracted feature data), or a combination thereof, from other UEs 115 in the disjoint set of UEs 115 (e.g., from the UE 115-*g*). The raw sensor data may include radio detection and ranging data, lighting detection and ranging data, camera image data, stereo-vision image data, velocity information, position information, or any combination thereof. The feature extraction outputs may include object bounding, objection location estimation, object orientation estimation, object detection, object classification, confidence measurement, mapping, compression of wireless channel information, or any combination thereof, based at least in part on aggregated sensor data, wireless data, and raw data.

In some examples, the lead UE 115-*h* may broadcast an indication of one or more extracted features associated with raw sensor data and raw measurement data to other UEs 115 (e.g., the UE 115-*g*) within the partition, or to other UEs 115 outside of the partition, or both. Such broadcasting may be accomplished based on an existing connection between UEs 115 for feature data sharing between UEs 115. In some examples, the lead UE 115-*h*, other UEs 115-*g*, or both, may transmit extracted features associated with the combined raw sensor data, raw measurement data, and local feature data, to the network entity 105-*b*. In some examples, the UE 115-*h* may receive the unicast signaling from other UEs 115, and then may forward the received data, or extracted feature data generated at the lead UE 115-*h* based on the received raw measurement and sensor data, or a combination thereof, to the network entity 105-*b*.

In some examples, the information may include partition reporting information, including one or more of sensor data associated with the UEs 115, sensor data extraction information associated with the set of UEs, position information, object occlusion information, partition cost information for sensor data associated with one or more UEs included in the set of UEs as well as one or more UEs excluded from the set of UEs, or any combination thereof. For example, each UE 115 (e.g., or at least the lead UE 115-*h*) may calculate a cost value associated with the partition between disjoint sets of UEs. The partition cost information may be based on the raw sensor data, raw measurement data, and extracted feature data (e.g., generated by the UE 115-*h*, or local feature data received via the unicast signaling from the other UEs 115 of the partition). The partition cost information may include an indication of a decrease in an accuracy level of feature extraction associated with sensor data shared by the first partition of UEs 115 with the lead UE 115-*h*, based on an absence of additional UEs 115 (e.g., assigned to another disjoint set of UEs 115).

Based on this information, the network entity 105-*b* may adjust one or more partitions (e.g., may add or remove one or more UEs 115 from a given partition, as described in greater detail with reference to FIG. 4), may update a lead UE assignment, or both. For example, the network entity 105-*b* may transmit another message including an updated partition information, updated lead assignment information, or both, as described in greater detail with reference to FIG. 6.

Figure 6:
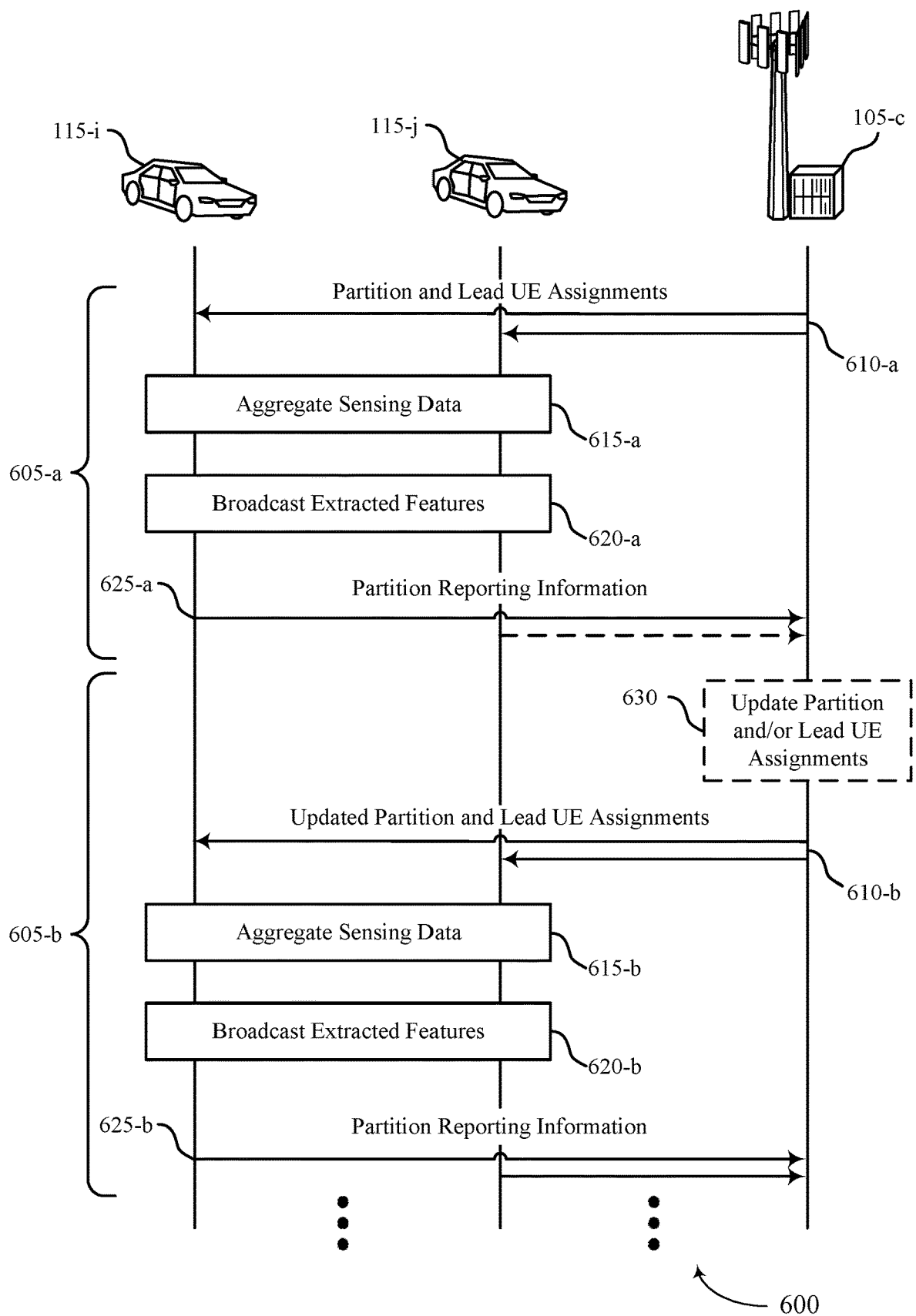
FIG. 6 shows an example of a process flow that supports hierarchical partitioning and sensor data aggregation in perceptive wireless communications systems in accordance with one or more aspects of the present disclosure.

FIG. 6 shows an example of a process flow 600 that supports hierarchical partitioning and sensor data aggregation in perceptive wireless communications systems in accordance with one or more aspects of the present disclosure.

Process flow 600 may implement aspects of, or be implemented by aspects of, FIGS. 1-5. The process flow 600 may include a network entity 105-*c*, a UE 115-*i*, and a UE 115-*j*, which may be examples of corresponding devices described with reference to FIGS. 1-5.

As described herein, in perceptive wireless environments, sensor occlusion failures in feature extraction and failures in sensor sharing-based feature aggregation may occur. By aggregating or fusing inter-related raw sensing data from a group of vehicles (e.g., a disjoint set of UEs 115, such as a partition), as well as merging any available sensor-sharing based features, UEs 115 may be able to more accurately extract features (e.g., from raw sensor data, or raw measurement data, or both). Transmitting raw sensing data to a central entity (e.g., a network entity 105-*c*, a ML server, among other examples) for aggregation may create additional overhead on uplink capacity. Instead, as described herein, transmitting raw sensing data from a group of UEs 115 (e.g., a partition) to an assigned lead UE 115-*j* for each partition may create a smaller overhead on the sidelink (e.g., V2X or V2V) channel capacity. Such signaling may be performed in addition to, or in the place of, local feature extraction.

To effectively share sensor data and improve the quality and accuracy of feature extraction, the UEs 115 and the network entity 105-*c* may perform iterative partitioning of UEs 115 and assignment of lead UEs 115. The UEs 115 and the network entity may trigger and establish adaptive sensing and hierarchical partitioning triggered by sensor occlusions, as described in greater detail with reference to FIG. 5.

In a first iteration 605-*a*, at 610-*a*, the network entity 105-*c* may transmit partition and lead UE assignments to the UE 115-*a* and the UE 115-*b*. As described with reference to FIG. 5, the signaling may include an indication of a public identifier assigned to a first set of UEs (e.g., a first partition). The public identifier may be associated with the UE 115-*j*, indicating that the UE 115-*j* is the lead UE of the partition.

At 615-*a*, the UEs 115 may aggregate sensing data. The UE 115-*i* and the UE 115-*j* may perform partition-based aggregation of raw sensing data at the lead UE 115-*j*. For instance, non-lead UEs 115 (e.g., the UE 115-*i*) may unicast raw sensor data, raw measurement data, local feature data, local feature extraction data, or a combination thereof to the UE 115-*h* (e.g., the lead UE 115), which may aggregate the received data.

At 620-*a*, the UE 115-*j* may broadcast extracted features (e.g., to other UEs 115 in the same partition, and to other UEs 115 in other partitions). The UE 115-*j* may broadcast the aggregation of features via V2V sensor sharing (e.g., at all UEs 115). For example, the UE 115-*j* may transmit (e.g., broadcast) an indication of one or more extracted features associated with the raw sensor data and the raw measurement data received from the other UEs 115 (e.g., the UE 115-*i*) to other UEs 115 (e.g., including the UE 115-*i*) within and outside the partition based at least in part on an existing connection for feature data sharing between the various UEs 115.

At 625-*a*, the UE 115-*j* (e.g., and other non-lead UEs 115, such as the UE 115-*i*) may transmit partition reporting information to the network entity 105-*c*. The partition reporting information may include UE sensing data, extracted features, inferred cost of partitioning the UEs, or any combination thereof. For example, as described with reference to FIG. 5, the UEs 115 may calculate cost information associated with the partitioning. The cost information may occur because for every UE 115 included in a different partition, the sensor data and feature extraction performed by the lead UE 115-*j* of the partition will suffer due to a lack of raw sensor data, raw measurement data, attempts (e.g., even incomplete ones) to generate feature extraction data, or a combination thereof, from the UEs 115 in the different partitions. For a given partition or grouping of vehicular UEs 115, the lead UEs 115 extract more accurate features (e.g., bounding boxes) based on the aggregated raw sensing data and feature aggregation. For example, the lead UE 115-*j* may extract more accurate features than the non-lead UE 115-*i*. However, each partition or grouping comes at the cost of excluding the raw sensing data from neighboring UEs 115 across a partition (e.g., from another partition or disjoint group). The cost of severing an edge e=(u, v) may be represented by c(e), which can be learned by the network entity 105-*c*. For example, an ML model may be trained to learn the cost c(e) in terms of loss in accuracy of the joint bounding boxes extracted without the raw sensing data contributed across the edge e. The ML model may also be trained to learn the cost avoided by creating fewer partitions. Once the cost of an edge c(e) is inferred (e.g., an ML model), any incremental changes in the partitioning can be quantified as incremental changes in cost. All incremental changes in partitions can be expressed as some nodes switching from $\mathcal{V}_{,1}$ to $\mathcal{V}_{,2}$, or vice versa. Then, for instance, the cost of partitioning can be stated as:

$$c(\mathcal{G}, \mathcal{G}_1, \mathcal{G}_2) = \sum_{e \in \{\mathcal{E} \setminus (\mathcal{E}_1 \cup \mathcal{E}_2)\}} c(e) - \alpha \cdot \sum_{e \in \mathcal{E}_1 \cup \mathcal{E}_2} c(e)^p \ni \alpha \geq 0, p \geq 0.$$

At iteration k (e.g., any iteration 605), the grouping or partitioning of the vehicular UEs 115 assigned by the network entity 105-*c* (which may be a gNB or the ML server). The central entity (e.g., the network entity 105-*c* or server) may also assign a lead UE (e.g., lead UE 115-*j*) to each group or partition that is created. Such a lead assignment may be based on proximity (which may ensure continuity of the same lead UE 115-*j* over multiple iterations in a dynamic environment), the size of raw data that needs to be transmitted from other UEs 115 in the same partition, computation power of the UE 115, the precision of the ML feature extraction models at the UE 115, or any combination thereof (e.g., any of which may be included in capability information, such as an indication of lead availability described with reference to 525 in FIG. 5, or in partition reporting information described with reference to 625-*a*, or a combination thereof). Additionally, or alternatively, the hierarchical partitioning algorithm may be implemented such that the vehicular UEs 115 in a partition or group (e.g., UE 115-*i*) may elect a lead UE based on the factors listed previously. If the UEs 115 in each partition or group do not have an established V2V connection with the respective lead UE 115, the required V2V connection must be established. For example, non-lead UE 115-*i* may establish a V2V connection with lead UE 115-*j*.

Based on the partition reporting information transmitted by one or more UEs 115 (e.g., including the UE 115-*i* and the UE 115-*j*), at 630, the network entity 105-*c* may update partitions, lead UE 115 assignments, or both. For example, the network entity 105-*c* may alter the partitioning (e.g., as described with reference to FIG. 4) into disjoint sets, and assign each set (e.g., each partition) a lead UE 115 (e.g., by moving exactly one UE from group 1 to group 2, or vice versa).

At 610-*b* (e.g., during a second iteration 605-*b*), the network entity 105-*c* may transmit an indication of updated partitions and lead UE assignments. For instance, the updated partition and lead UE assignment may indicate changes to the partition and lead UE assignments, such as moving a UE 115 into or out of a current partition, change an assignment of lead UE 115-*j* to make UE 115-*i* the new lead UE, or a combination thereof.

At 615-*b*, the UEs 115 may aggregate sensing data. The UE 115-*i* and the UE 115-*j* may perform partition-based aggregation of raw sensing data at the lead UE 115-*i* (e.g., if the new lead UE is the UE 115-*i* based on the updated lead UE assignment). For instance, non-lead UEs (e.g., the UE 115-*j*) may unicast raw sensor data, raw measurement data, local feature data, local feature extraction data, or a combination thereof to the UE 115-*i* (e.g., the lead UE 115), which may aggregate the received data.

At 620-*b*, the UE 115-*i* may broadcast extracted features (e.g., to other UEs 115 in the same partition, and to other UEs 115 in other partitions). The UE 115-*i* may broadcast the aggregation of features via V2V sensor sharing (e.g., at all UEs 115). For example, the UE 115-*i* may transmit (e.g., broadcast) an indication of one or more extracted features associated with the raw sensor data and the raw measurement data received from the other UEs 115 (e.g., the UE 115-*j*) to other UEs 115 (e.g., including the UE 115-*j*) within and outside the partition based at least in part on an existing connection for feature data sharing between the various UEs 115.

At 625-*b*, the UE 115-*i* (e.g., and other non-lead UEs, such as the UE 115-*j*) may transmit partition reporting information to the network entity 105-*c*. The partition reporting information may include UE sensing data, extracted features, inferred cost of partitioning the UEs, or any combination thereof.

The UEs 115 and the network entity 105-*c* may continue to calculate and report cost information, and update partition and lead UE assignments over multiple iterations (e.g., until the network entity 105-*c* disables partitioning, or until an ML session is terminated).

Figure 7:
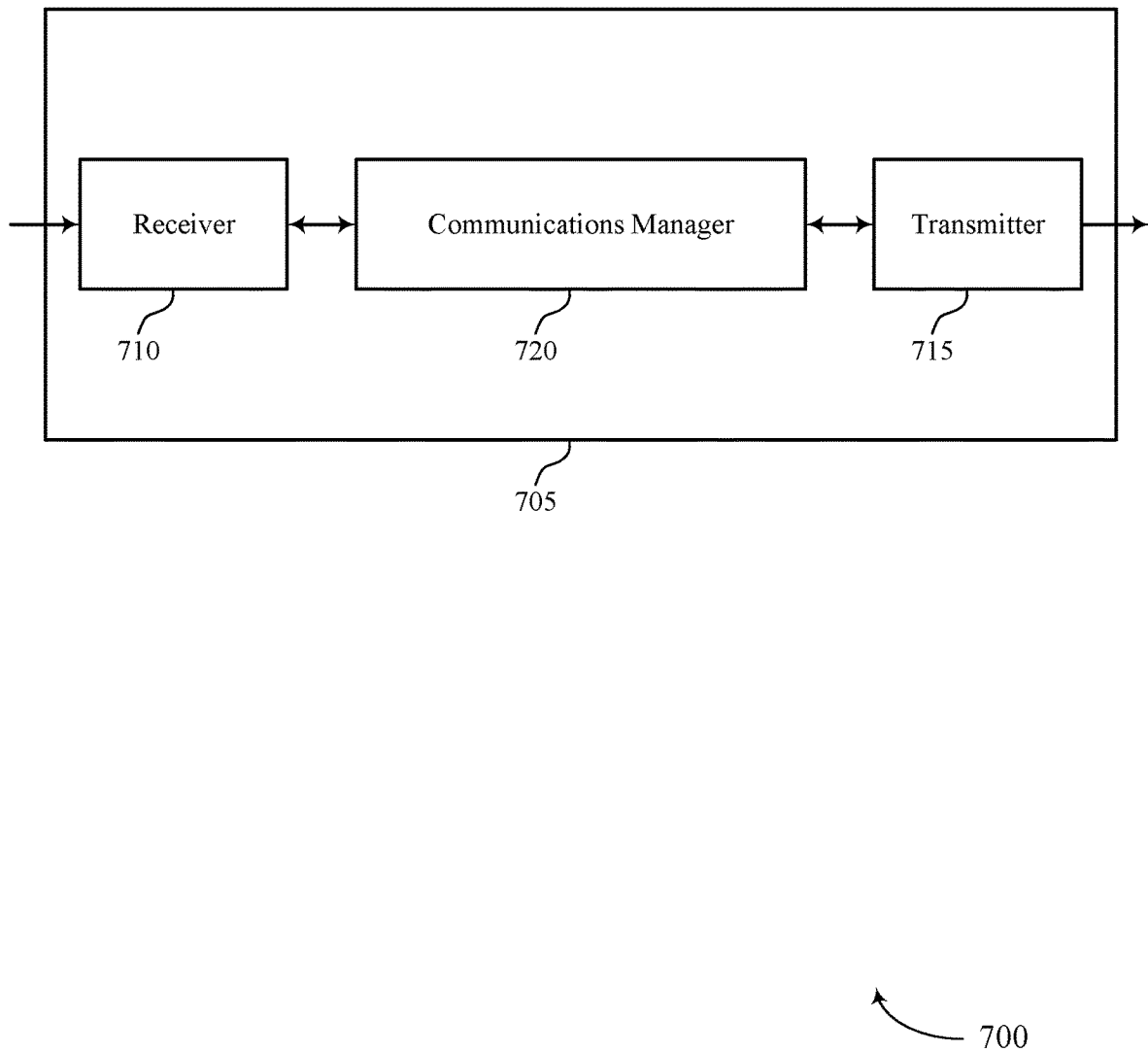
FIGS. 7 and 8 show block diagrams of devices that support hierarchical partitioning and sensor data aggregation in perceptive wireless communications systems in accordance with one or more aspects of the present disclosure.

FIG. 7 shows a block diagram 700 of a device 705 that supports hierarchical partitioning and sensor data aggregation in perceptive wireless communications systems in accordance with one or more aspects of the present disclosure. The device 705 may be an example of aspects of a UE 115 as described herein. The device 705 may include a receiver 710, a transmitter 715, and a communications manager 720. The device 705 may also include at least one processor. Each of these components may be in communication with one another (e.g., via one or more buses).

The receiver 710 may provide a means for receiving information such as packets, user data, control information, or any combination thereof associated with various information channels (e.g., control channels, data channels, information channels related to hierarchical partitioning and sensor data aggregation in perceptive wireless communications systems). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to hierarchical partitioning and sensor data aggregation in perceptive wireless communications systems). In some examples, the transmitter 715 may be co-located with a receiver 710 in a transceiver module. The transmitter 715 may utilize a single antenna or a set of multiple antennas.

The communications manager 720, the receiver 710, the transmitter 715, or various combinations thereof or various components thereof may be examples of means for performing various aspects of hierarchical partitioning and sensor data aggregation in perceptive wireless communications systems as described herein. For example, the communications manager 720, the receiver 710, the transmitter 715, or various combinations or components thereof may support a method for performing one or more of the functions described herein.

In some examples, the communications manager 720, the receiver 710, the transmitter 715, or various combinations or components thereof may be implemented in hardware (e.g., in communications management circuitry). The hardware may include at least one processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, at least one processor and memory coupled with the at least one processor may be configured to perform one or more of the functions described herein (e.g., by executing, by the at least one processor, instructions stored in the at least one memory).

Additionally, or alternatively, in some examples, the communications manager 720, the receiver 710, the transmitter 715, or various combinations or components thereof may be implemented in code (e.g., as communications management software or firmware) executed by at least one processor. If implemented in code executed by at least one processor, the functions of the communications manager 720, the receiver 710, the transmitter 715, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 720 may be configured to perform various operations (e.g., receiving, obtaining, monitoring, outputting, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to obtain information, output information, or perform various other operations as described herein.

The communications manager 720 may support wireless communications at a first UE in accordance with examples as disclosed herein. For example, the communications manager 720 is capable of, configured to, or operable to support a means for receiving a first indication comprising a request for initiating participation in a hierarchical partitioning-based data-sharing session in which a plurality of UEs are grouped into a plurality of disjoint sets of UEs for sharing raw sensor data, raw measurement data, and feature extraction outputs corresponding to the raw sensor data and the raw measurement data. The communications manager 720 is capable of, configured to, or operable to support a means for transmitting a second indication comprising a response message indicating participation in the hierarchical partitioning based data-sharing session, in response to receiving the first indication. The communications manager 720 is capable of, configured to, or operable to support a means for receiving, based at least in part on transmitting the second indication, a third indication comprising a public identifier assigned to a first set of UEs of the plurality of disjoint sets of UEs, wherein the first set of UEs comprises the first UE and the public identifier is associated with a lead UE within the first set of UEs.

By including or configuring the communications manager 720 in accordance with examples as described herein, the device 705 (e.g., at least one processor controlling or otherwise coupled with the receiver 710, the transmitter 715, the communications manager 720, or a combination thereof) may support techniques for data coordination and feature extraction resulting in reduced overhead signaling, improved utilization of available system resources, improved feature detection and feature extraction, and improved user experience.

Figure 8:
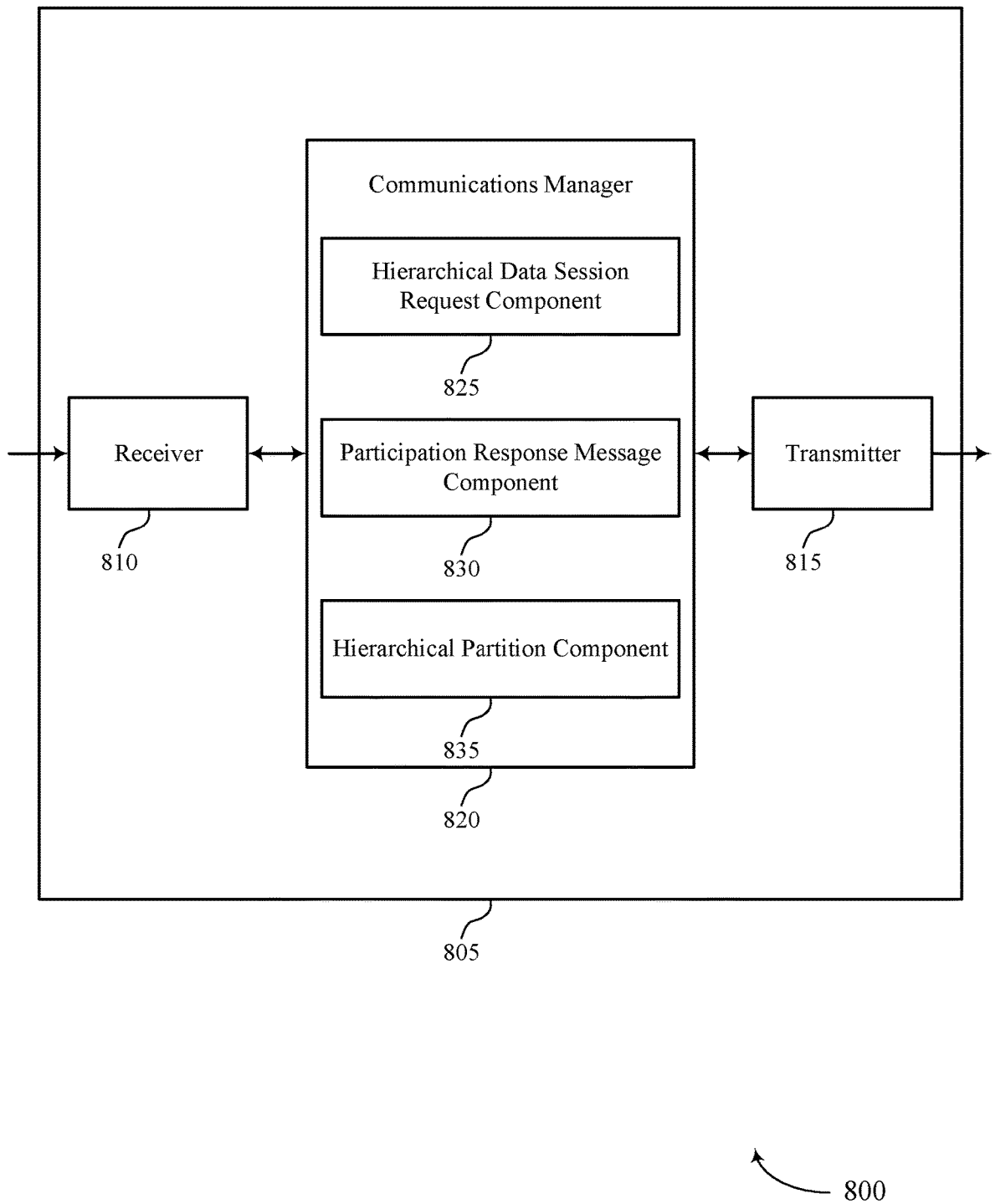

FIG. 8 shows a block diagram 800 of a device 805 that supports hierarchical partitioning and sensor data aggregation in perceptive wireless communications systems in accordance with one or more aspects of the present disclosure. The device 805 may be an example of aspects of a device 705 or a UE 115 as described herein. The device 805 may include a receiver 810, a transmitter 815, and a communications manager 820. The device 805 may also include at least one processor. Each of these components may be in communication with one another (e.g., via one or more buses).

The receiver 810 may provide a means for receiving information such as packets, user data, control information, or any combination thereof associated with various information channels (e.g., control channels, data channels, information channels related to hierarchical partitioning and sensor data aggregation in perceptive wireless communications systems). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to hierarchical partitioning and sensor data aggregation in perceptive wireless communications systems). In some examples, the transmitter 815 may be co-located with a receiver 810 in a transceiver module. The transmitter 815 may utilize a single antenna or a set of multiple antennas.

The device 805, or various components thereof, may be an example of means for performing various aspects of hierarchical partitioning and sensor data aggregation in perceptive wireless communications systems as described herein. For example, the communications manager 820 may include a hierarchical data session request component 825, a participation response message component 830, a hierarchical partition component 835, or any combination thereof. The communications manager 820 may be an example of aspects of a communications manager 720 as described herein. In some examples, the communications manager 820, or various components thereof, may be configured to perform various operations (e.g., receiving, obtaining, monitoring, outputting, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to obtain information, output information, or perform various other operations as described herein.

The communications manager 820 may support wireless communications at a first UE in accordance with examples as disclosed herein. The hierarchical data session request component 825 is capable of, configured to, or operable to support a means for receiving a first indication comprising a request for initiating participation in a hierarchical partitioning-based data-sharing session in which a plurality of UEs are grouped into a plurality disjoint sets of UEs for sharing raw sensor data, raw measurement data, and feature extraction outputs corresponding to the raw sensor data and the raw measurement data. The participation response message component 830 is capable of, configured to, or operable to support a means for transmitting a second indication comprising a response message indicating participation in the hierarchical partitioning based data-sharing session, in response to receiving the first indication. The hierarchical partition component 835 is capable of, configured to, or operable to support a means for receiving, based at least in part on transmitting the second indication, a third indication comprising a public identifier assigned to a first set of UEs of the plurality disjoint sets of UEs, wherein the first set of UEs includes the first UE and the public identifier is associated with a lead UE within the first set of UEs.

Figure 9:
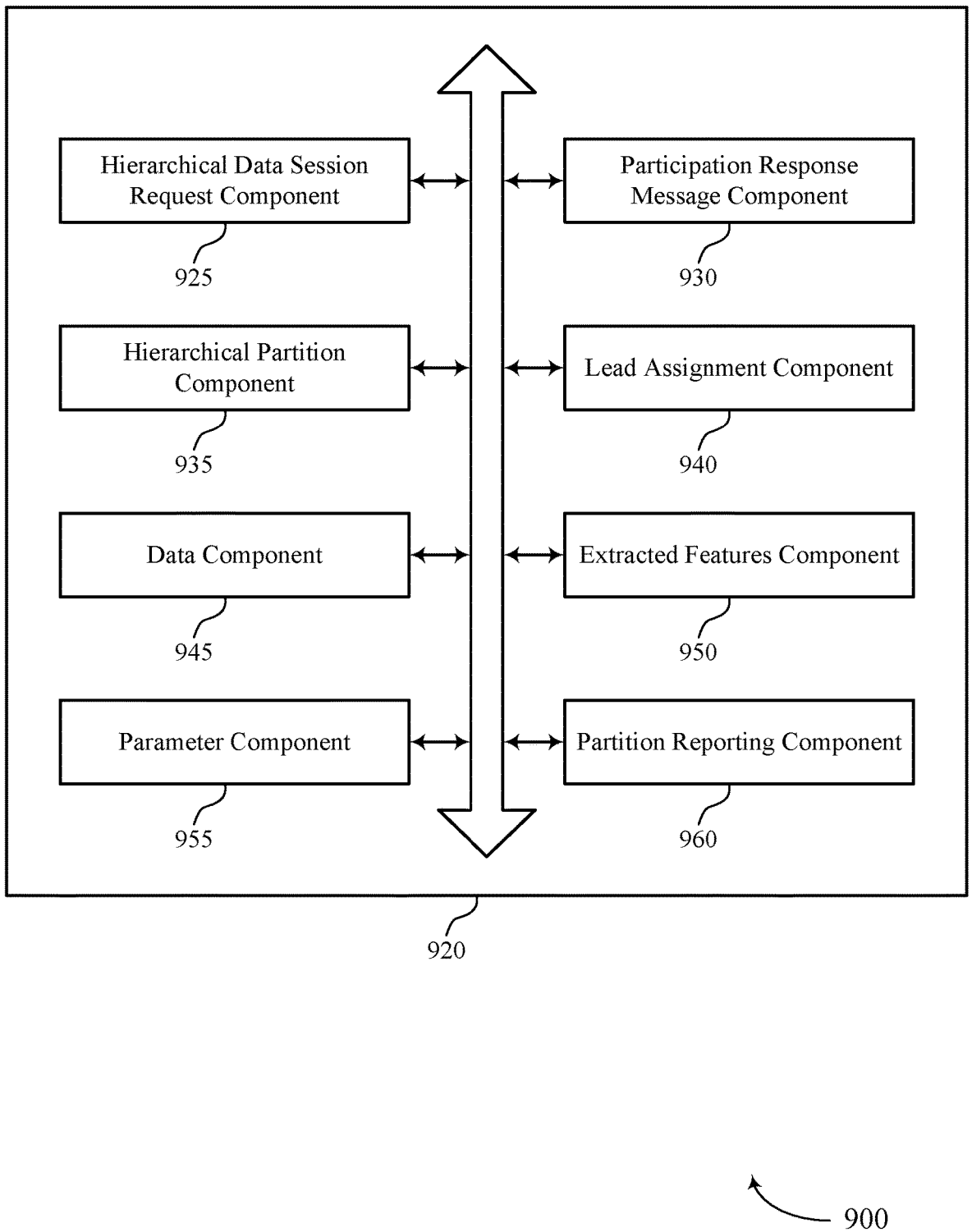
FIG. 9 shows a block diagram of a communications manager that supports hierarchical partitioning and sensor data aggregation in perceptive wireless communications systems in accordance with one or more aspects of the present disclosure.

FIG. 9 shows a block diagram 900 of a communications manager 920 that supports hierarchical partitioning and sensor data aggregation in perceptive wireless communications systems in accordance with one or more aspects of the present disclosure. The communications manager 920 may be an example of aspects of a communications manager 720, a communications manager 820, or both, as described herein. The communications manager 920, or various components thereof, may be an example of means for performing various aspects of hierarchical partitioning and sensor data aggregation in perceptive wireless communications systems as described herein. For example, the communications manager 920 may include a hierarchical data session request component 925, a participation response message component 930, a hierarchical partition component 935, a lead assignment component 940, a data component 945, an extracted features component 950, a parameter component 955, a partition reporting component 960, or any combination thereof. Each of these components may communicate, directly or indirectly, with one another (e.g., via one or more buses).

The communications manager 920 may support wireless communications at a first UE in accordance with examples as disclosed herein. The hierarchical data session request component 925 is capable of, configured to, or operable to support a means for receiving a first indication comprising a request for initiating participation in a hierarchical partitioning-based data-sharing session in which a plurality of UEs are grouped into a plurality disjoint sets of UEs for sharing raw sensor data, raw measurement data, and feature extraction outputs corresponding to the raw sensor data and the raw measurement data. The participation response message component 930 is capable of, configured to, or operable to support a means for transmitting a second indication comprising a response message indicating participation in the hierarchical partitioning based data-sharing session, in response to receiving the first indication. The hierarchical partition component 935 is capable of, configured to, or operable to support a means for receiving, based at least in part on transmitting the second indication, a third indication comprising a public identifier assigned to a first set of UEs of the plurality disjoint sets of UEs, wherein the first set of UEs includes the first UE and the public identifier is associated with a lead UE within the first set of UEs.

In some examples, the participation response message component 930 is capable of, configured to, or operable to support a means for transmitting a fourth indication to denote an availability of the first UE to act as the lead UE, wherein the fourth indication is multiplexed with, included in, or separate from the second indication. In some examples, the lead assignment component 940 is capable of, configured to, or operable to support a means for receiving a fifth indication that the first UE is the lead UE of the first set of UEs, wherein the fifth indication is multiplexed with, included in, or separate from the third indication. In some examples, the data component 945 is capable of, configured to, or operable to support a means for receiving unicast signaling comprising the raw sensor data, the raw measurement data, and local feature data from each respective UE of the first set of UEs based at least in part on a public identifier of the lead UE being the same as the public identifier of the first UE.

In some examples, the extracted features component 950 is capable of, configured to, or operable to support a means for transmitting an indication of one or more extracted features associated with combined raw sensor data, raw measurement data, and local feature data to a network entity based at least in part on the first UE receiving the unicast signaling comprising the raw sensor, the raw measurement data, and the local feature data.

In some examples, receiving the fifth indication that the first UE is the lead UE is based at least in part on transmitting the fourth indication that the first UE is capable of performing as the lead UE.

In some examples, the parameter component 955 is capable of, configured to, or operable to support a means for transmitting one or more parameters comprising location information, a quantity of sensor data generated by the first UE, computation power capability associated with the first UE, or any combination thereof, wherein receiving the fifth indication that the first UE is the lead UE is based at least in part on the one or more parameters.

In some examples, the partition reporting component 960 is capable of, configured to, or operable to support a means for transmitting, to a network entity, partition reporting information comprising one or more of sensor data associated with the first set of UEs, sensor data extraction information associated with the first set of UEs, position information associated with the first UE or the first set of UEs, object occlusion information associated with the first set of UEs, partition cost information for sensor data associated with one or more UEs included in the first set of UEs as well as one or more UEs excluded from the first set of UEs but included in the plurality disjoint sets of UEs, or any combination thereof. In some examples, the hierarchical partition component 935 is capable of, configured to, or operable to support a means for receiving a sixth indication indicating the public identifier of an updated first set of UEs of a plurality updated disjoint sets of UEs, an updated indication of a new lead UE, or any combination thereof.

In some examples, the data component 945 is capable of, configured to, or operable to support a means for calculating a cost value associated with a partition between the first set of UEs and the second set of UEs, the partition cost information being based at least in part on the raw sensor data, the raw measurement data, and local feature data received.

In some examples, the partition cost information includes an indication of a decrease in an accuracy level of feature extraction associated with sensor data shared by the first set of UEs with the lead UE based, at least in part, on an absence of the one or more UEs of the second set of UEs from the first set of UEs. In some examples, receiving the sixth indication is based at least in part on the partition cost information.

In some examples, the extracted features component 950 is capable of, configured to, or operable to support a means for broadcasting an indication of one or more extracted features associated with the raw sensor data and the raw measurement data to a plurality UEs within and outside the first set of UEs based at least in part on an existing connection for feature data sharing between the first UE and the plurality UEs.

In some examples, the lead assignment component 940 is capable of, configured to, or operable to support a means for receiving an indication that a second UE of the first set of UEs is the lead UE, wherein the fifth indication is multiplexed with, included in, or separate from the third indication. In some examples, the data component 945 is capable of, configured to, or operable to support a means for transmitting unicast signaling comprising the raw sensor data, the raw measurement data, and local feature data from the first UE to the second UE based at least in part on the indication that the second UE is the lead UE.

In some examples, the extracted features component 950 is capable of, configured to, or operable to support a means for receiving, from the second UE based at least in part on transmitting the unicast signaling comprising the raw sensor data, the raw measurement data, and local feature data, a broadcast message comprising one or more extracted features associated with the raw sensor data, the raw measurement data, and the local feature data.

In some examples, the data component 945 is capable of, configured to, or operable to support a means for transmitting the raw sensor data, the raw measurement data, an indication of one or more locally extracted features associated with the raw sensor data or the raw measurement data, or any combination thereof, to a network entity.

In some examples, the sharing raw sensor data includes sharing radio detection and ranging data, lighting detection and ranging data, camera image data, stereo-vision image data, velocity information, position information, or any combination thereof.

In some examples, the sharing raw measurement data includes sharing wireless channel statistics, channel state information, or a combination thereof, of a vehicular UE or a cellular UE paired with the vehicular UE, or any combination thereof.

In some examples, the feature extraction outputs include object bounding, objection location estimation, object orientation estimation, object detection, object classification, confidence measurement, mapping, compression of wireless channel information, or any combination thereof, based at least in part on aggregated sensor data, wireless data, and raw data.

Figure 10:
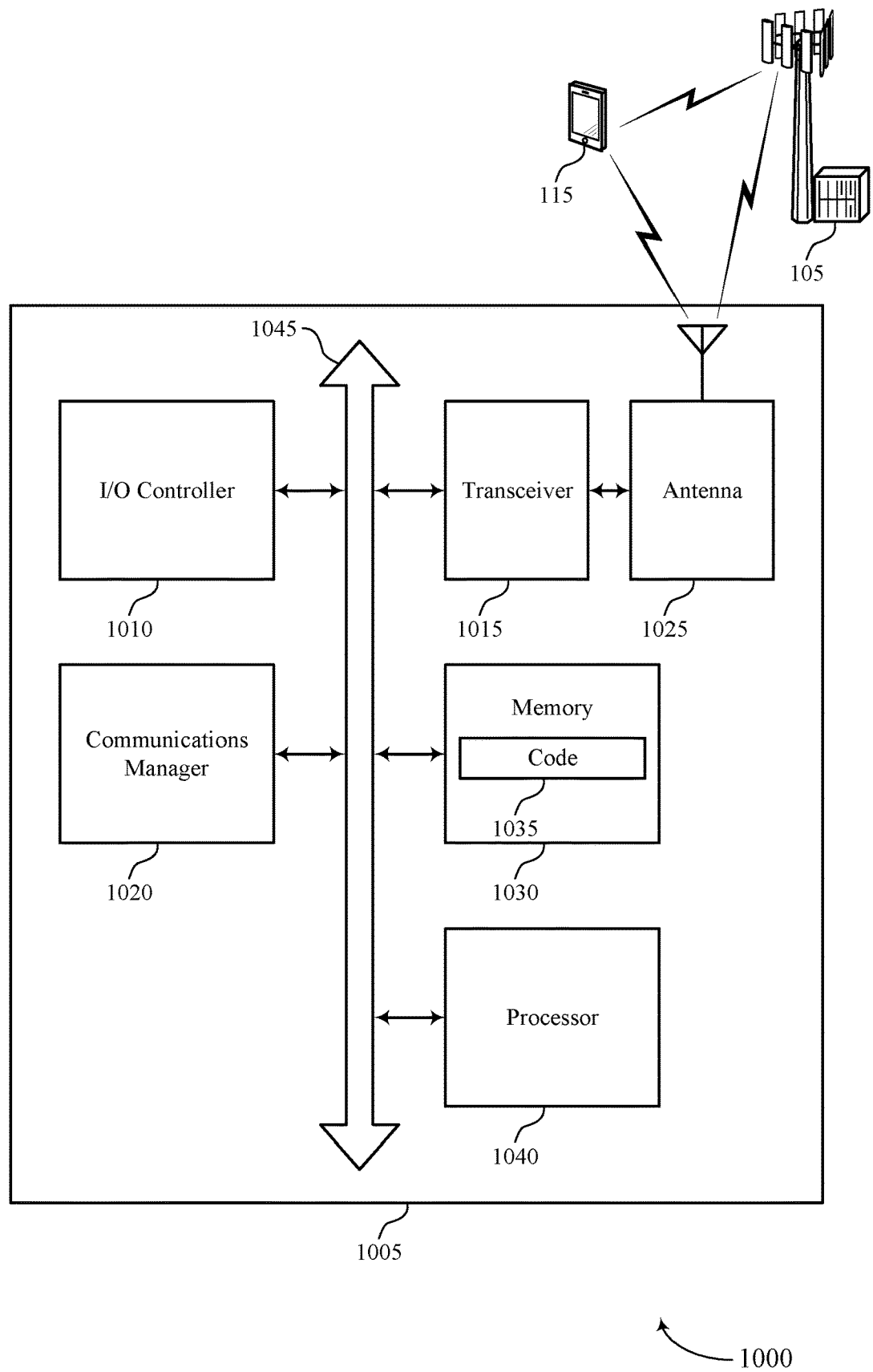
FIG. 10 shows a diagram of a system including a device that supports hierarchical partitioning and sensor data aggregation in perceptive wireless communications systems in accordance with one or more aspects of the present disclosure.

FIG. 10 shows a diagram of a system 1000 including a device 1005 that supports hierarchical partitioning and sensor data aggregation in perceptive wireless communications systems in accordance with one or more aspects of the present disclosure. The device 1005 may be an example of or include the components of a device 705, a device 805, or a UE 115 as described herein. The device 1005 may communicate (e.g., wirelessly) with one or more network entities 105, one or more UEs 115, or any combination thereof. The device 1005 may include components for bi-directional voice and data communications comprising components for transmitting and receiving communications, such as a communications manager 1020, an input/output (I/O) controller 1010, a transceiver 1015, an antenna 1025, at least one memory 1030, code 1035, and at least one processor 1040. These components may be in electronic communication or otherwise coupled (e.g., operatively, communicatively, functionally, electronically, electrically) via one or more buses (e.g., a bus 1045).

The I/O controller 1010 may manage input and output signals for the device 1005. The I/O controller 1010 may also manage peripherals not integrated into the device 1005. In some cases, the I/O controller 1010 may represent a physical connection or port to an external peripheral. In some cases, the I/O controller 1010 may utilize an operating system such as iOS®, ANDROID®, MS-DOS®, MS-WINDOWS®, OS/2®, UNIX®, LINUX®, or another known operating system. Additionally, or alternatively, the I/O controller 1010 may represent or interact with a modem, a keyboard, a mouse, a touchscreen, or a similar device. In some cases, the I/O controller 1010 may be implemented as part of at least one processor, such as the at least one processor 1040. In some cases, a user may interact with the device 1005 via the I/O controller 1010 or via hardware components controlled by the I/O controller 1010.

In some cases, the device 1005 may include a single antenna 1025. However, in some other cases, the device 1005 may have more than one antenna 1025, which may be capable of concurrently transmitting or receiving multiple wireless transmissions. The transceiver 1015 may communicate bi-directionally, via the one or more antennas 1025, wired, or wireless links as described herein. For example, the transceiver 1015 may represent a wireless transceiver and may communicate bi-directionally with another wireless transceiver. The transceiver 1015 may also include a modem to modulate the packets, to provide the modulated packets to one or more antennas 1025 for transmission, and to demodulate packets received from the one or more antennas 1025. The transceiver 1015, or the transceiver 1015 and one or more antennas 1025, may be an example of a transmitter 715, a transmitter 815, a receiver 710, a receiver 810, or any combination thereof or component thereof, as described herein.

The at least one memory 1030 may include random access memory (RAM) and read-only memory (ROM). The at least one memory 1030 may store computer-readable, computer-executable code 1035 comprising instructions that, when executed by the at least one processor 1040, cause the device 1005 to perform various functions described herein. The code 1035 may be stored in a non-transitory computer-readable medium such as system memory or another type of memory. In some cases, the code 1035 may not be directly executable by the at least one processor 1040 but may cause a computer (e.g., when compiled and executed) to perform functions described herein. In some cases, the at least one memory 1030 may contain, among other things, a basic I/O system (BIOS) which may control basic hardware or software operation such as the interaction with peripheral components or devices.

The at least one processor 1040 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the at least one processor 1040 may be configured to operate at least one memory array using at least one memory controller. In some other cases, at least one memory controller may be integrated into the at least one processor 1040. The at least one processor 1040 may be configured to execute computer-readable instructions stored in at least one memory (e.g., the at least one memory 1030) to cause the device 1005 to perform various functions (e.g., functions or tasks supporting hierarchical partitioning and sensor data aggregation in perceptive wireless communications systems). For example, the device 1005 or a component of the device 1005 may include at least one processor 1040 and memory 1030 coupled with or to the at least one processor 1040, the at least one processor 1040 and memory 1030 configured to perform various functions described herein.

The communications manager 1020 may support wireless communications at a first UE in accordance with examples as disclosed herein. For example, the communications manager 1020 is capable of, configured to, or operable to support a means for receiving a first indication comprising a request for initiating participation in a hierarchical partitioning-based data-sharing session in which a plurality of UEs are grouped into a plurality disjoint sets of UEs for sharing raw sensor data, raw measurement data, and feature extraction outputs corresponding to the raw sensor data and the raw measurement data. The communications manager 1020 is capable of, configured to, or operable to support a means for transmitting a second indication comprising a response message indicating participation in the hierarchical partitioning based data-sharing session, in response to receiving the first indication. The communications manager 1020 is capable of, configured to, or operable to support a means for receiving, based at least in part on transmitting the second indication, a third indication comprising a public identifier assigned to a first set of UEs of the plurality disjoint sets of UEs, wherein the first set of UEs includes the first UE and the public identifier is associated with (e.g., assigned to, corresponding to, or indicating) a lead UE within the first set of UEs.

By including or configuring the communications manager 1020 in accordance with examples as described herein, the device 1005 may support techniques for data coordination and feature extraction resulting in reduced overhead signaling, improved utilization of available system resources, improved feature detection and feature extraction, improved safety features, reduced occlusion, and improved user experience.

In some examples, the communications manager 1020 may be configured to perform various operations (e.g., receiving, monitoring, transmitting) using or otherwise in cooperation with the transceiver 1015, the one or more antennas 1025, or any combination thereof. Although the communications manager 1020 is illustrated as a separate component, in some examples, one or more functions described with reference to the communications manager 1020 may be supported by or performed by the at least one processor 1040, the at least one memory 1030, the code 1035, or any combination thereof. For example, the code 1035 may include instructions executable by the at least one processor 1040 to cause the device 1005 to perform various aspects of hierarchical partitioning and sensor data aggregation in perceptive wireless communications systems as described herein, or the at least one processor 1040 and the at least one memory 1030 may be otherwise configured to perform or support such operations.

Figure 11:
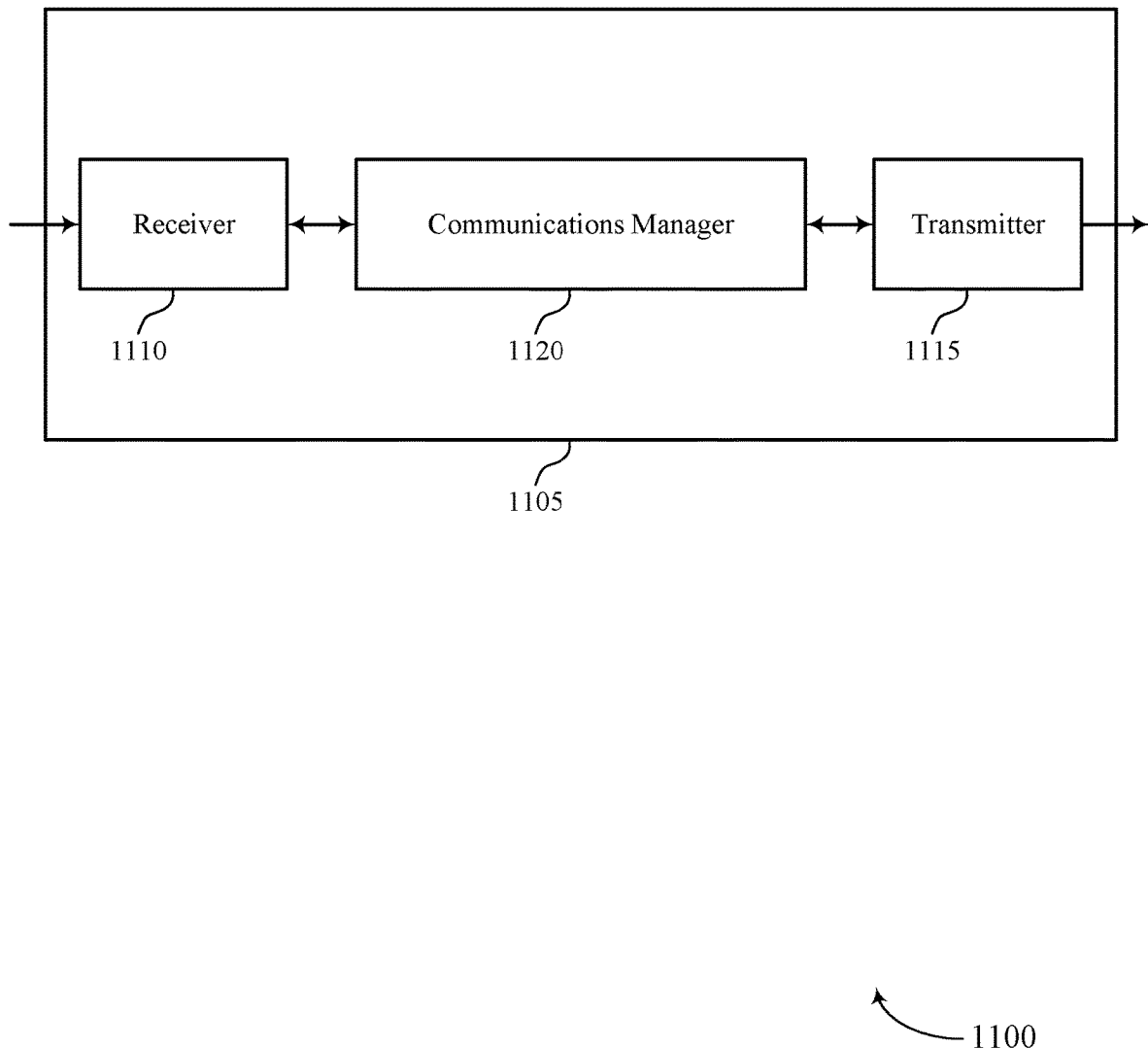
FIGS. 11 and 12 show block diagrams of devices that support hierarchical partitioning and sensor data aggregation in perceptive wireless communications systems in accordance with one or more aspects of the present disclosure.

FIG. 11 shows a block diagram 1100 of a device 1105 that supports hierarchical partitioning and sensor data aggregation in perceptive wireless communications systems in accordance with one or more aspects of the present disclosure. The device 1105 may be an example of aspects of a network entity 105 as described herein. The device 1105 may include a receiver 1110, a transmitter 1115, and a communications manager 1120. The device 1105 may also include at least one processor. Each of these components may be in communication with one another (e.g., via one or more buses).

The receiver 1110 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1105. In some examples, the receiver 1110 may support obtaining information by receiving signals via one or more antennas. Additionally, or alternatively, the receiver 1110 may support obtaining information by receiving signals via one or more wired (e.g., electrical, fiber optic) interfaces, wireless interfaces, or any combination thereof.

The transmitter 1115 may provide a means for outputting (e.g., transmitting, providing, conveying, sending) information generated by other components of the device 1105. For example, the transmitter 1115 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1115 may support outputting information by transmitting signals via one or more antennas. Additionally, or alternatively, the transmitter 1115 may support outputting information by transmitting signals via one or more wired (e.g., electrical, fiber optic) interfaces, wireless interfaces, or any combination thereof. In some examples, the transmitter 1115 and the receiver 1110 may be co-located in a transceiver, which may include or be coupled with a modem.

The communications manager 1120, the receiver 1110, the transmitter 1115, or various combinations thereof or various components thereof may be examples of means for performing various aspects of hierarchical partitioning and sensor data aggregation in perceptive wireless communications systems as described herein. For example, the communications manager 1120, the receiver 1110, the transmitter 1115, or various combinations or components thereof may support a method for performing one or more of the functions described herein.

In some examples, the communications manager 1120, the receiver 1110, the transmitter 1115, or various combinations or components thereof may be implemented in hardware (e.g., in communications management circuitry). The hardware may include at least one processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, at least one processor and memory coupled with the at least one processor may be configured to perform one or more of the functions described herein (e.g., by executing, by the at least one processor, instructions stored in the at least one memory).

Additionally, or alternatively, in some examples, the communications manager 1120, the receiver 1110, the transmitter 1115, or various combinations or components thereof may be implemented in code (e.g., as communications management software or firmware) executed by at least one processor. If implemented in code executed by at least one processor, the functions of the communications manager 1120, the receiver 1110, the transmitter 1115, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 1120 may be configured to perform various operations (e.g., receiving, obtaining, monitoring, outputting, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to obtain information, output information, or perform various other operations as described herein.

The communications manager 1120 may support wireless communications at a network entity in accordance with examples as disclosed herein. For example, the communications manager 1120 is capable of, configured to, or operable to support a means for transmitting, to a plurality user equipments (UEs), a first indication comprising a request for initiating participation in a hierarchical partitioning-based data-sharing session in which a plurality of UEs are grouped into a plurality disjoint sets of UEs for sharing raw sensor data, raw measurement data, and feature extraction outputs corresponding to the raw sensor data and the raw measurement data. The communications manager 1120 is capable of, configured to, or operable to support a means for receiving a second indication comprising a response message indicating participation in the hierarchical partitioning-based data-sharing session, in response to transmitting the first indication. The communications manager 1120 is capable of, configured to, or operable to support a means for transmitting, to the plurality UEs based at least in part on receiving the second indication, a third indication comprising a public identifier assigned to a first set of UEs of the plurality disjoint sets of UEs, wherein the first set of UEs includes the first UE and the public identifier is associated with a lead UE within the first set of UEs.

By including or configuring the communications manager 1120 in accordance with examples as described herein, the device 1105 (e.g., at least one processor controlling or otherwise coupled with the receiver 1110, the transmitter 1115, the communications manager 1120, or a combination thereof) may support techniques for data coordination and feature extraction resulting in reduced overhead signaling, improved utilization of available system resources, improved feature detection and feature extraction, and improved user experience.

Figure 12:
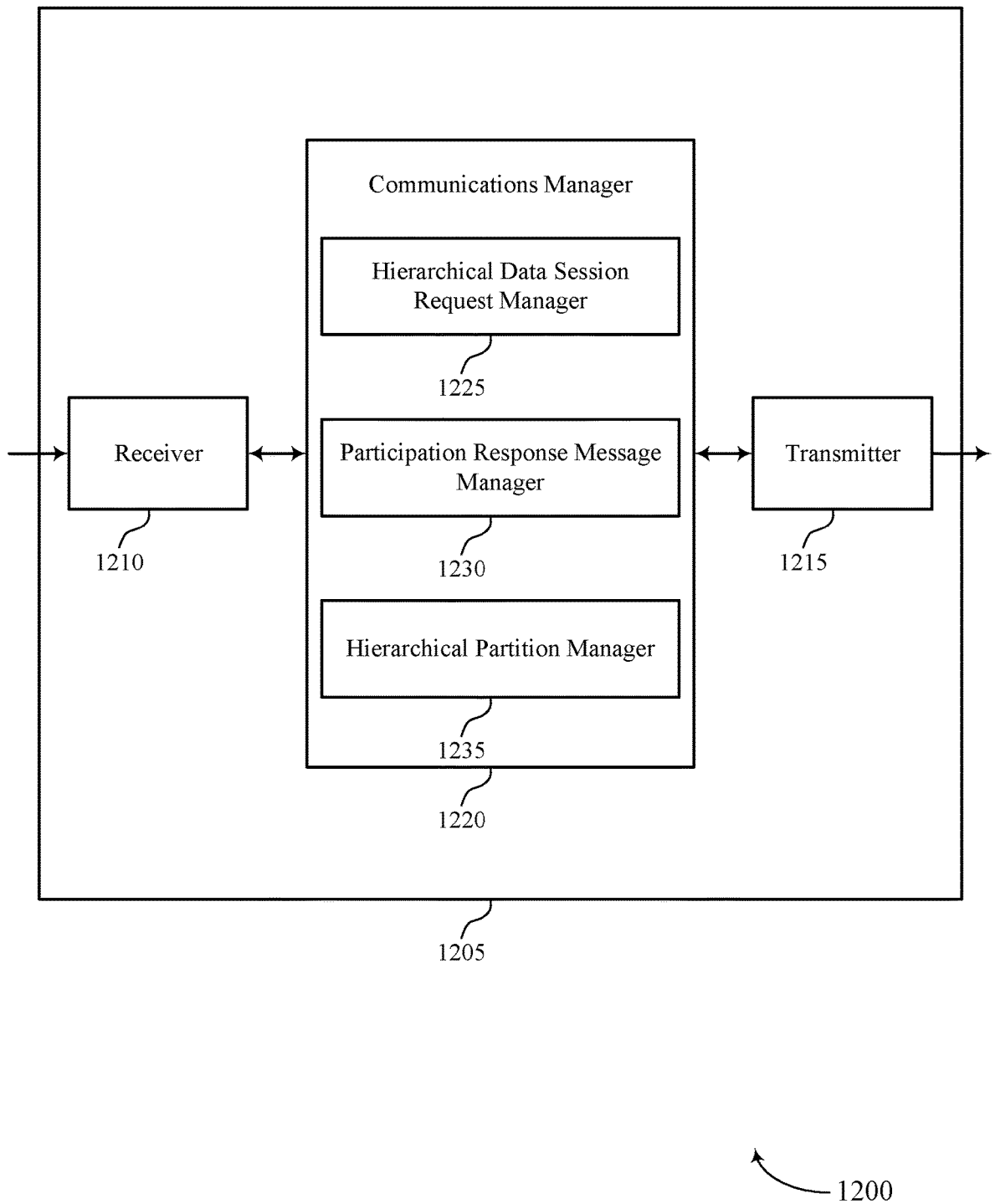

FIG. 12 shows a block diagram 1200 of a device 1205 that supports hierarchical partitioning and sensor data aggregation in perceptive wireless communications systems in accordance with one or more aspects of the present disclosure. The device 1205 may be an example of aspects of a device 1105 or a network entity 105 as described herein. The device 1205 may include a receiver 1210, a transmitter 1215, and a communications manager 1220. The device 1205 may also include at least one processor. Each of these components may be in communication with one another (e.g., via one or more buses).

The receiver 1210 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1205. In some examples, the receiver 1210 may support obtaining information by receiving signals via one or more antennas. Additionally, or alternatively, the receiver 1210 may support obtaining information by receiving signals via one or more wired (e.g., electrical, fiber optic) interfaces, wireless interfaces, or any combination thereof.

The transmitter 1215 may provide a means for outputting (e.g., transmitting, providing, conveying, sending) information generated by other components of the device 1205. For example, the transmitter 1215 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1215 may support outputting information by transmitting signals via one or more antennas. Additionally, or alternatively, the transmitter 1215 may support outputting information by transmitting signals via one or more wired (e.g., electrical, fiber optic) interfaces, wireless interfaces, or any combination thereof. In some examples, the transmitter 1215 and the receiver 1210 may be co-located in a transceiver, which may include or be coupled with a modem.

The device 1205, or various components thereof, may be an example of means for performing various aspects of hierarchical partitioning and sensor data aggregation in perceptive wireless communications systems as described herein. For example, the communications manager 1220 may include a hierarchical data session request manager 1225, a participation response message manager 1230, a hierarchical partition manager 1235, or any combination thereof. The communications manager 1220 may be an example of aspects of a communications manager 1120 as described herein. In some examples, the communications manager 1220, or various components thereof, may be configured to perform various operations (e.g., receiving, obtaining, monitoring, outputting, transmitting) using or otherwise in cooperation with the receiver 1210, the transmitter 1215, or both. For example, the communications manager 1220 may receive information from the receiver 1210, send information to the transmitter 1215, or be integrated in combination with the receiver 1210, the transmitter 1215, or both to obtain information, output information, or perform various other operations as described herein.

The communications manager 1220 may support wireless communications at a network entity in accordance with examples as disclosed herein. The hierarchical data session request manager 1225 is capable of, configured to, or operable to support a means for transmitting, to a plurality user equipments (UEs), a first indication comprising a request for initiating participation in a hierarchical partitioning-based data-sharing session in which a plurality of UEs are grouped into a plurality disjoint sets of UEs for sharing raw sensor data, raw measurement data, and feature extraction outputs corresponding to the raw sensor data and the raw measurement data. The participation response message manager 1230 is capable of, configured to, or operable to support a means for receiving a second indication comprising a response message indicating participation in the hierarchical partitioning-based data-sharing session, in response to transmitting the first indication. The hierarchical partition manager 1235 is capable of, configured to, or operable to support a means for transmitting, to the plurality UEs based at least in part on receiving the second indication, a third indication comprising a public identifier assigned to a first set of UEs of the plurality disjoint sets of UEs, wherein the first set of UEs includes the first UE and the public identifier is associated with a lead UE within the first set of UEs.

Figure 13:
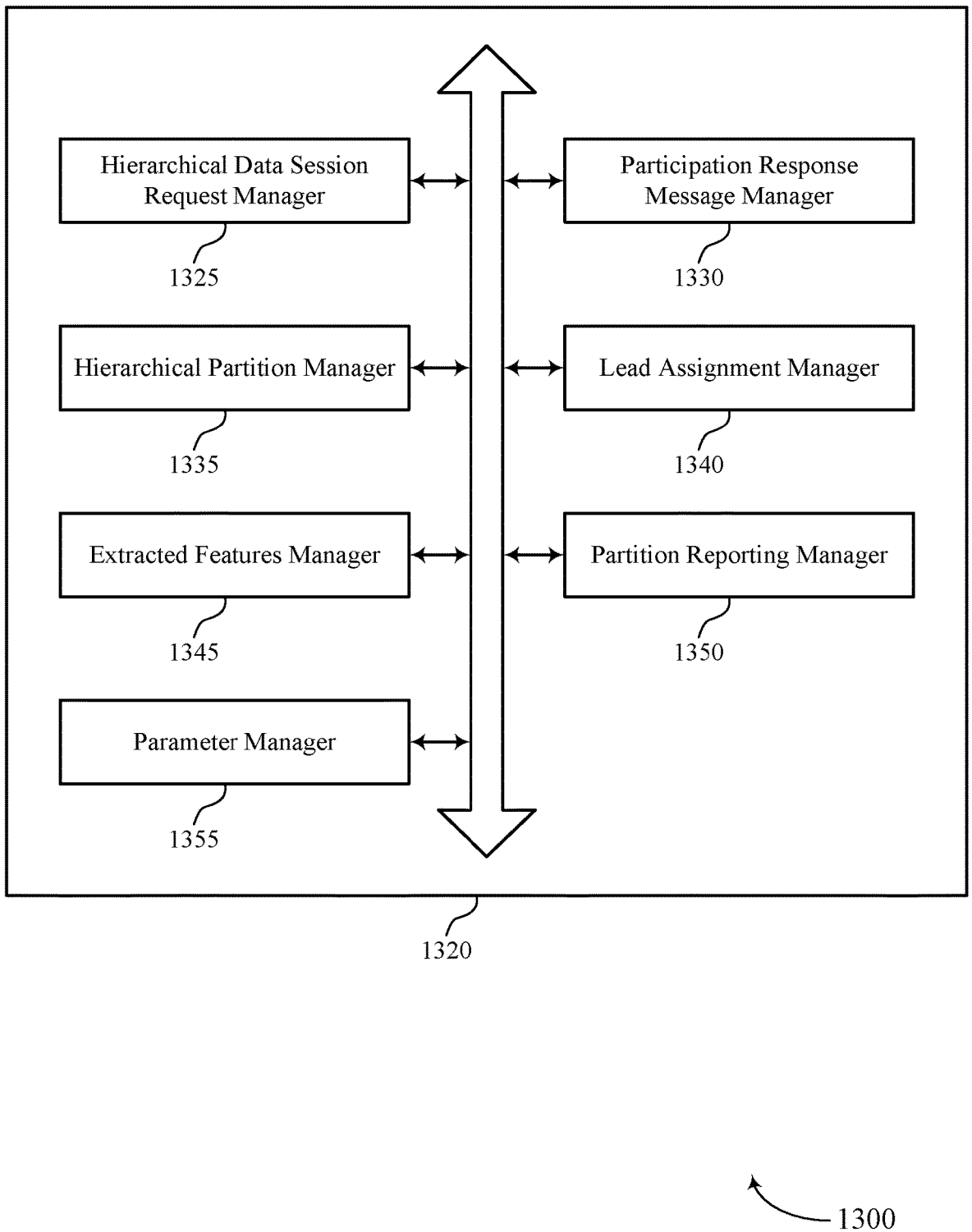
FIG. 13 shows a block diagram of a communications manager that supports hierarchical partitioning and sensor data aggregation in perceptive wireless communications systems in accordance with one or more aspects of the present disclosure.

FIG. 13 shows a block diagram 1300 of a communications manager 1320 that supports hierarchical partitioning and sensor data aggregation in perceptive wireless communications systems in accordance with one or more aspects of the present disclosure. The communications manager 1320 may be an example of aspects of a communications manager 1120, a communications manager 1220, or both, as described herein. The communications manager 1320, or various components thereof, may be an example of means for performing various aspects of hierarchical partitioning and sensor data aggregation in perceptive wireless communications systems as described herein. For example, the communications manager 1320 may include a hierarchical data session request manager 1325, a participation response message manager 1330, a hierarchical partition manager 1335, a lead assignment manager 1340, an extracted features manager 1345, a partition reporting manager 1350, a parameter manager 1355, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1320 may support wireless communications at a network entity in accordance with examples as disclosed herein. The hierarchical data session request manager 1325 is capable of, configured to, or operable to support a means for transmitting, to a plurality user equipments (UEs), a first indication comprising a request for initiating participation in a hierarchical partitioning-based data-sharing session in which a plurality of UEs are grouped into a plurality disjoint sets of UEs for sharing raw sensor data, raw measurement data, and feature extraction outputs corresponding to the raw sensor data and the raw measurement data. The participation response message manager 1330 is capable of, configured to, or operable to support a means for receiving a second indication comprising a response message indicating participation in the hierarchical partitioning-based data-sharing session, in response to transmitting the first indication. The hierarchical partition manager 1335 is capable of, configured to, or operable to support a means for transmitting, to the plurality UEs based at least in part on receiving the second indication, a third indication comprising a public identifier assigned to a first set of UEs of the plurality disjoint sets of UEs, wherein the first set of UEs includes the first UE and the public identifier is associated with a lead UE within the first set of UEs.

In some examples, the participation response message manager 1330 is capable of, configured to, or operable to support a means for receiving a fourth indication to denote an availability of the first UE to act as the lead UE, wherein the fourth indication is multiplexed with, included in, or separate from the second indication. In some examples, the lead assignment manager 1340 is capable of, configured to, or operable to support a means for transmitting a fifth indication that the first UE is the lead UE of the first set of UEs, wherein the fifth indication is multiplexed with, included in, or separate from the third indication. In some examples, the extracted features manager 1345 is capable of, configured to, or operable to support a means for receiving an indication of one or more extracted features associated with combined sensor and data and the raw measurement data from each lead UE of the plurality disjoint sets of UEs based at least in part on each lead UE receiving unicast signaling comprising the raw sensor data, raw measurement data, and local feature data from each respective UE of each disjoint set of UEs of the plurality disjoint sets of UEs.

In some examples, transmitting the fifth indication that the first UE is the lead UE is based at least in part on receiving the indication that the first UE is capable of performing as the lead UE.

In some examples, the parameter manager 1355 is capable of, configured to, or operable to support a means for receiving one or more parameters comprising location information, a quantity of sensor data generated by the first UE, computation power capability associated with the first UE, or any combination thereof, wherein receiving the indication that the first UE is the lead UE is based at least in part on the one or more parameters.

In some examples, the partition reporting manager 1350 is capable of, configured to, or operable to support a means for receiving, from one or more UEs of the first set of UEs, partition reporting information comprising one or more of the raw sensor data and the raw measurement data associated with the first set of UEs, sensor data extraction information associated with the first set of UEs, position information associated with the first UE or the first set of UEs, object occlusion information associated with the first set of UEs, partition cost information for sensor data associated with one or more UEs of a second set of UEs of the plurality disjoint sets of UEs, or any combination thereof. In some examples, the hierarchical partition manager 1335 is capable of, configured to, or operable to support a means for transmitting, to the first set of UEs, the second set of UEs, or both, a sixth indication indicating the public identifier of an updated first set of UEs of a plurality updated disjoint sets of UEs, an updated indication of a new lead UE, or any combination thereof.

In some examples, the partition cost information includes a cost value associated with a partition between the first set of UEs and the second set of UEs.

In some examples, the partition cost information includes an indication of a decrease in an accuracy level of feature extraction associated with sensor data shared by the first set of UEs with the lead UE based at least in part on an absence of the one or more UEs of the second set of UEs from the first set of UEs. In some examples, transmitting the sixth indication is based at least in part on the partition cost information.

In some examples, the sharing raw sensor data includes sharing radio detection and ranging data, lighting detection and ranging data, camera image data, stereo-vision image data, velocity information, position information, or any combination thereof.

In some examples, the sharing raw measurement data includes sharing wireless channel statistics, channel state information, or a combination thereof, of a vehicular UE or a cellular UE paired with the vehicular UE, or any combination thereof.

In some examples, the feature extraction outputs include object bounding, objection location estimation, object orientation estimation, object detection, object classification, confidence measurement, mapping, compression of wireless channel information, or any combination thereof, based at least in part on aggregated sensor data, wireless data, and raw data.

Figure 14:
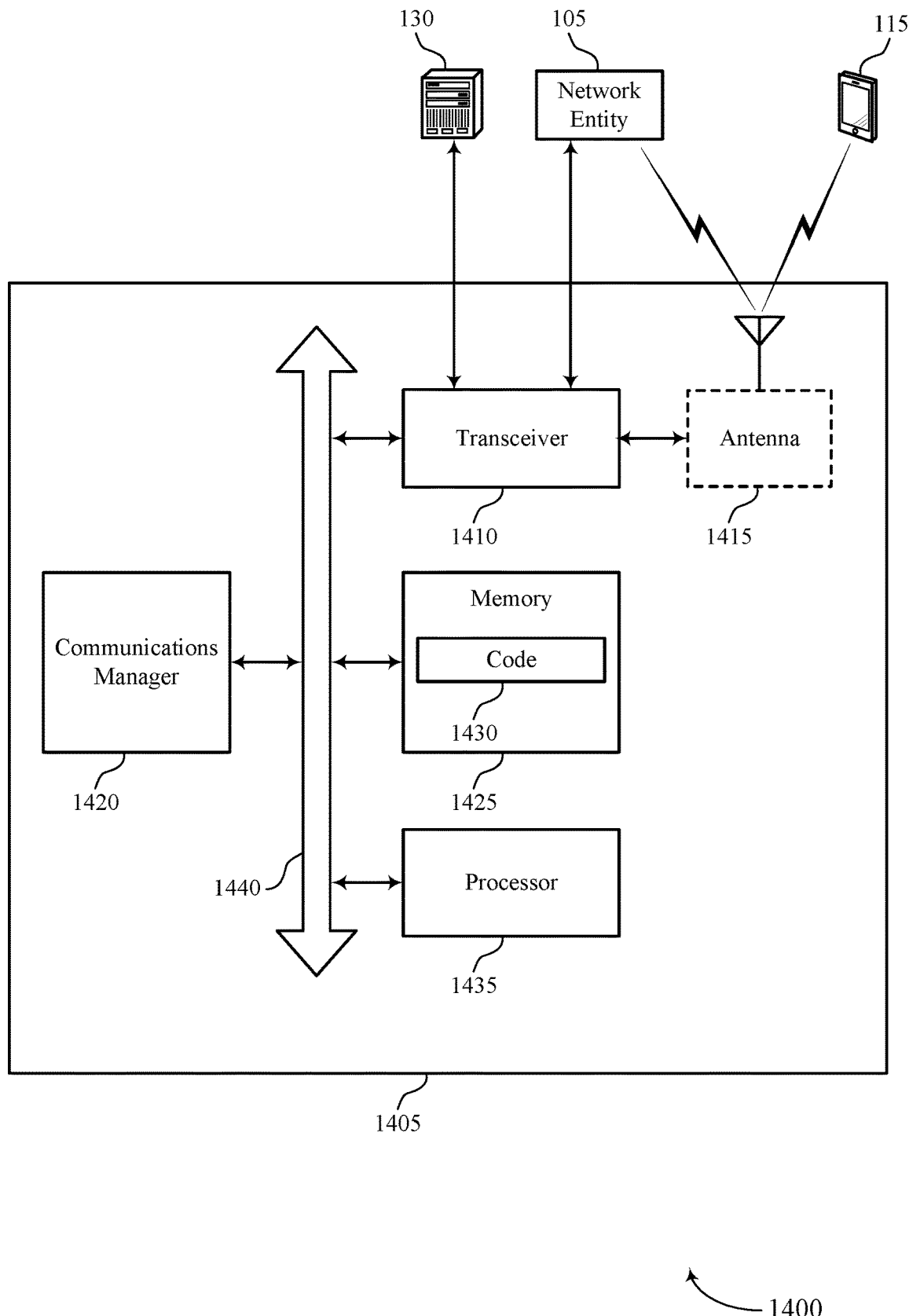
FIG. 14 shows a diagram of a system including a device that supports hierarchical partitioning and sensor data aggregation in perceptive wireless communications systems in accordance with one or more aspects of the present disclosure.

FIG. 14 shows a diagram of a system 1400 including a device 1405 that supports hierarchical partitioning and sensor data aggregation in perceptive wireless communications systems in accordance with one or more aspects of the present disclosure. The device 1405 may be an example of or include the components of a device 1105, a device 1205, or a network entity 105 as described herein. The device 1405 may communicate with one or more network entities 105, one or more UEs 115, or any combination thereof, which may include communications over one or more wired interfaces, over one or more wireless interfaces, or any combination thereof. The device 1405 may include components that support outputting and obtaining communications, such as a communications manager 1420, a transceiver 1410, an antenna 1415, at least one memory 1425, code 1430, and at least one processor 1435. These components may be in electronic communication or otherwise coupled (e.g., operatively, communicatively, functionally, electronically, electrically) via one or more buses (e.g., a bus 1440).

The transceiver 1410 may support bi-directional communications via wired links, wireless links, or both as described herein. In some examples, the transceiver 1410 may include a wired transceiver and may communicate bi-directionally with another wired transceiver. Additionally, or alternatively, in some examples, the transceiver 1410 may include a wireless transceiver and may communicate bi-directionally with another wireless transceiver. In some examples, the device 1405 may include one or more antennas 1415, which may be capable of transmitting or receiving wireless transmissions (e.g., concurrently). The transceiver 1410 may also include a modem to modulate signals, to provide the modulated signals for transmission (e.g., by one or more antennas 1415, by a wired transmitter), to receive modulated signals (e.g., from one or more antennas 1415, from a wired receiver), and to demodulate signals. In some implementations, the transceiver 1410 may include one or more interfaces, such as one or more interfaces coupled with the one or more antennas 1415 that are configured to support various receiving or obtaining operations, or one or more interfaces coupled with the one or more antennas 1415 that are configured to support various transmitting or outputting operations, or a combination thereof. In some implementations, the transceiver 1410 may include or be configured for coupling with one or more processors or memory components that are operable to perform or support operations based at least in part on received or obtained information or signals, or to generate information or other signals for transmission or other outputting, or any combination thereof. In some implementations, the transceiver 1410, or the transceiver 1410 and the one or more antennas 1415, or the transceiver 1410 and the one or more antennas 1415 and one or more processors or memory components (for example, the at least one processor 1435, or the at least one memory 1425, or both), may be included in a chip or chip assembly that is installed in the device 1405. In some examples, the transceiver may be operable to support communications via one or more communications links (e.g., a communication link 125, a backhaul communication link 120, a midhaul communication link 162, a fronthaul communication link 168).

The at least one memory 1425 may include RAM and ROM. The at least one memory 1425 may store computer-readable, computer-executable code 1430 including instructions that, when executed by the at least one processor 1435, cause the device 1405 to perform various functions described herein. The code 1430 may be stored in a non-transitory computer-readable medium such as system memory or another type of memory. In some cases, the code 1430 may not be directly executable by the at least one processor 1435 but may cause a computer (e.g., when compiled and executed) to perform functions described herein. In some cases, the at least one memory 1425 may contain, among other things, a BIOS which may control basic hardware or software operation such as the interaction with peripheral components or devices.

The at least one processor 1435 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the at least one processor 1435 may be configured to operate at least one memory array using at least one memory controller. In some other cases, at least one memory controller may be integrated into the at least one processor 1435. The at least one processor 1435 may be configured to execute computer-readable instructions stored in at least one memory (e.g., the at least one memory 1425) to cause the device 1405 to perform various functions (e.g., functions or tasks supporting hierarchical partitioning and sensor data aggregation in perceptive wireless communications systems). For example, the device 1405 or a component of the device 1405 may include at least one processor 1435 and memory 1425 coupled with the at least one processor 1435, the at least one processor 1435 and memory 1425 configured to perform various functions described herein. The at least one processor 1435 may be an example of a cloud-computing platform (e.g., one or more physical nodes and supporting software such as operating systems, virtual machines, or container instances) that may host the functions (e.g., by executing code 1430) to perform the functions of the device 1405. The at least one processor 1435 may be any one or more suitable processors capable of executing scripts or instructions of one or more software programs stored in the device 1405 (such as within the at least one memory 1425). In some implementations, the at least one processor 1435 may be a component of a processing system. A processing system may generally refer to a system or series of machines or components that receives inputs and processes the inputs to produce a set of outputs (which may be passed to other systems or components of, for example, the device 1405). For example, a processing system of the device 1405 may refer to a system including the various other components or subcomponents of the device 1405, such as the at least one processor 1435, or the transceiver 1410, or the communications manager 1420, or other components or combinations of components of the device 1405. The processing system of the device 1405 may interface with other components of the device 1405, and may process information received from other components (such as inputs or signals) or output information to other components. For example, a chip or modem of the device 1405 may include a processing system and one or more interfaces to output information, or to obtain information, or both. The one or more interfaces may be implemented as or otherwise include a first interface configured to output information and a second interface configured to obtain information, or a same interface configured to output information and to obtain information, among other implementations. In some implementations, the one or more interfaces may refer to an interface between the processing system of the chip or modem and a transmitter, such that the device 1405 may transmit information output from the chip or modem. Additionally, or alternatively, in some implementations, the one or more interfaces may refer to an interface between the processing system of the chip or modem and a receiver, such that the device 1405 may obtain information or signal inputs, and the information may be passed to the processing system. A person having ordinary skill in the art will readily recognize that a first interface also may obtain information or signal inputs, and a second interface also may output information or signal outputs.

In some examples, a bus 1440 may support communications of (e.g., within) a protocol layer of a protocol stack. In some examples, a bus 1440 may support communications associated with a logical channel of a protocol stack (e.g., between protocol layers of a protocol stack), which may include communications performed within a component of the device 1405, or between different components of the device 1405 that may be co-located or located in different locations (e.g., where the device 1405 may refer to a system in which one or more of the communications manager 1420, the transceiver 1410, the at least one memory 1425, the code 1430, and the at least one processor 1435 may be located in one of the different components or divided between different components).

In some examples, the communications manager 1420 may manage aspects of communications with a core network 130 (e.g., via one or more wired or wireless backhaul links). For example, the communications manager 1420 may manage the transfer of data communications for client devices, such as one or more UEs 115. In some examples, the communications manager 1420 may manage communications with other network entities 105, and may include a controller or scheduler for controlling communications with UEs 115 in cooperation with other network entities 105. In some examples, the communications manager 1420 may support an X2 interface within an LTE/LTE-A wireless communications network technology to provide communication between network entities 105.

The communications manager 1420 may support wireless communications at a network entity in accordance with examples as disclosed herein. For example, the communications manager 1420 is capable of, configured to, or operable to support a means for transmitting, to a plurality user equipments (UEs), a first indication comprising a request for initiating participation in a hierarchical partitioning-based data-sharing session in which a plurality of UEs are grouped into a plurality disjoint sets of UEs for sharing raw sensor data, raw measurement data, and feature extraction outputs corresponding to the raw sensor data and the raw measurement data. The communications manager 1420 is capable of, configured to, or operable to support a means for receiving a second indication comprising a response message indicating participation in the hierarchical partitioning-based data-sharing session, in response to transmitting the first indication. The communications manager 1420 is capable of, configured to, or operable to support a means for transmitting, to the plurality UEs based at least in part on receiving the second indication, a third indication comprising a public identifier assigned to a first set of UEs of the plurality disjoint sets of UEs, wherein the first set of UEs includes the first UE and the public identifier is associated with a lead UE within the first set of UEs.

By including or configuring the communications manager 1420 in accordance with examples as described herein, the device 1405 may support techniques for data coordination and feature extraction resulting in reduced overhead signaling, improved utilization of available system resources, improved feature detection and feature extraction, improved safety features, reduced occlusion, and improved user experience.

In some examples, the communications manager 1420 may be configured to perform various operations (e.g., receiving, obtaining, monitoring, outputting, transmitting) using or otherwise in cooperation with the transceiver 1410, the one or more antennas 1415 (e.g., where applicable), or any combination thereof. Although the communications manager 1420 is illustrated as a separate component, in some examples, one or more functions described with reference to the communications manager 1420 may be supported by or performed by the transceiver 1410, the at least one processor 1435, the at least one memory 1425, the code 1430, or any combination thereof. For example, the code 1430 may include instructions executable by the at least one processor 1435 to cause the device 1405 to perform various aspects of hierarchical partitioning and sensor data aggregation in perceptive wireless communications systems as described herein, or the at least one processor 1435 and the at least one memory 1425 may be otherwise configured to perform or support such operations.

Figure 15:
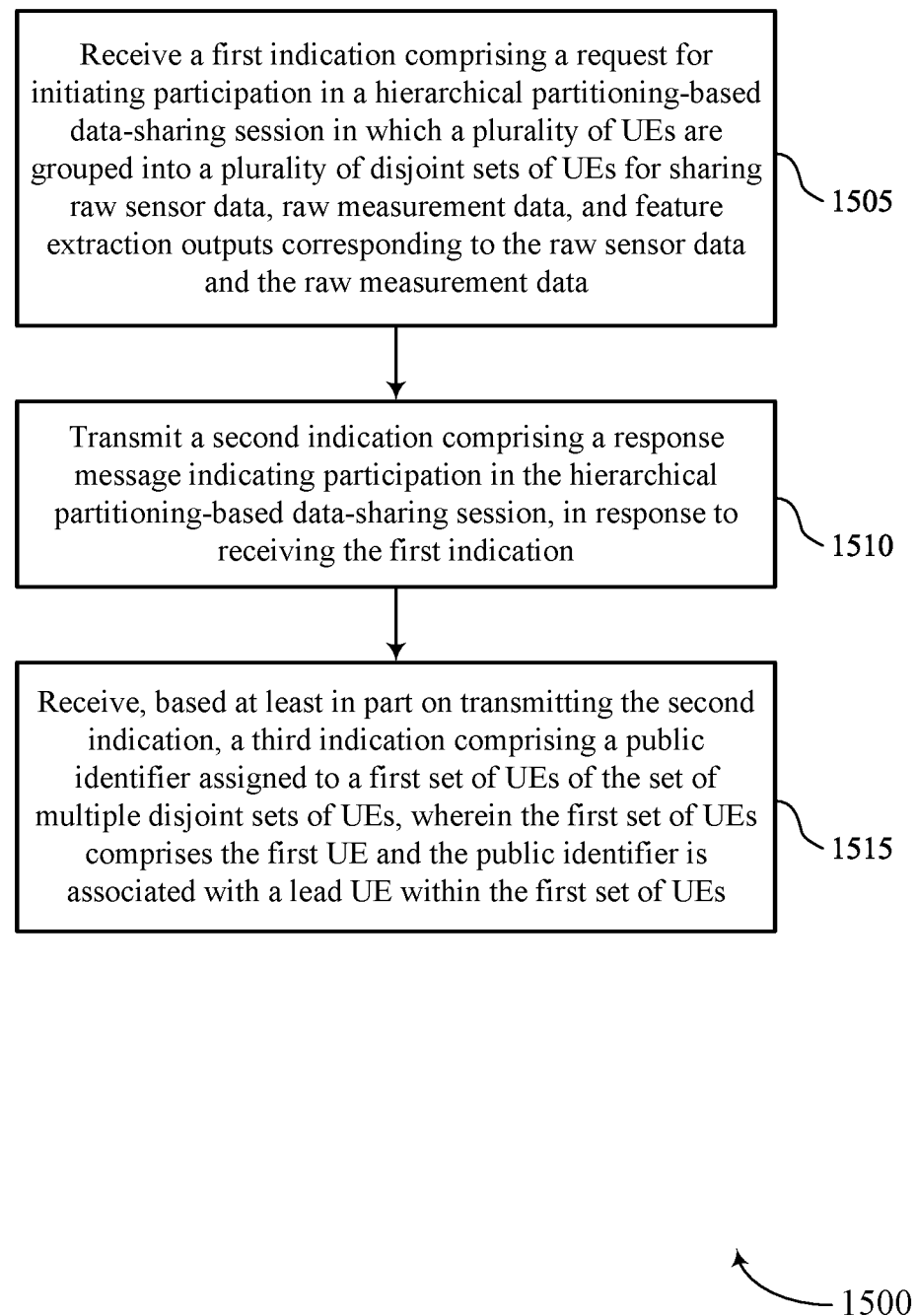
FIGS. 15 through 19 show flowcharts illustrating methods that support hierarchical partitioning and sensor data aggregation in perceptive wireless communications systems in accordance with one or more aspects of the present disclosure.

FIG. 15 shows a flowchart illustrating a method 1500 that supports hierarchical partitioning and sensor data aggregation in perceptive wireless communications systems in accordance with aspects of the present disclosure. The operations of the method 1500 may be implemented by a UE or its components as described herein. For example, the operations of the method 1500 may be performed by a UE 115 as described with reference to FIGS. 1 through 10. In some examples, a UE may execute a set of instructions to control the functional elements of the wireless UE to perform the described functions. Additionally, or alternatively, the wireless UE may perform aspects of the described functions using special-purpose hardware.

At 1505, the method may include receiving a first indication comprising a request for initiating participation in a hierarchical partitioning-based data-sharing session in which a plurality of UEs are grouped into a plurality of disjoint sets of UEs for sharing raw sensor data, raw measurement data, and feature extraction outputs corresponding to the raw sensor data and the raw measurement data. The operations of 1505 may be performed in accordance with examples as disclosed herein. In some examples, aspects of the operations of 1505 may be performed by a hierarchical data session request component 925 as described with reference to FIG. 9.

At 1510, the method may include transmitting a second indication comprising a response message indicating participation in the hierarchical partitioning based data-sharing session, in response to receiving the first indication. The operations of 1510 may be performed in accordance with examples as disclosed herein. In some examples, aspects of the operations of 1510 may be performed by a participation response message component 930 as described with reference to FIG. 9.

At 1515, the method may include receiving, based at least in part on transmitting the second indication, a third indication comprising a public identifier assigned to a first set of UEs of the plurality of disjoint sets of UEs, wherein the first set of UEs includes the first UE and the public identifier is associated (e.g., assigned to, corresponding to, or indicating) with a lead UE within the first set of UEs. The operations of 1515 may be performed in accordance with examples as disclosed herein. In some examples, aspects of the operations of 1515 may be performed by a hierarchical partition component 935 as described with reference to FIG. 9.

Figure 16:
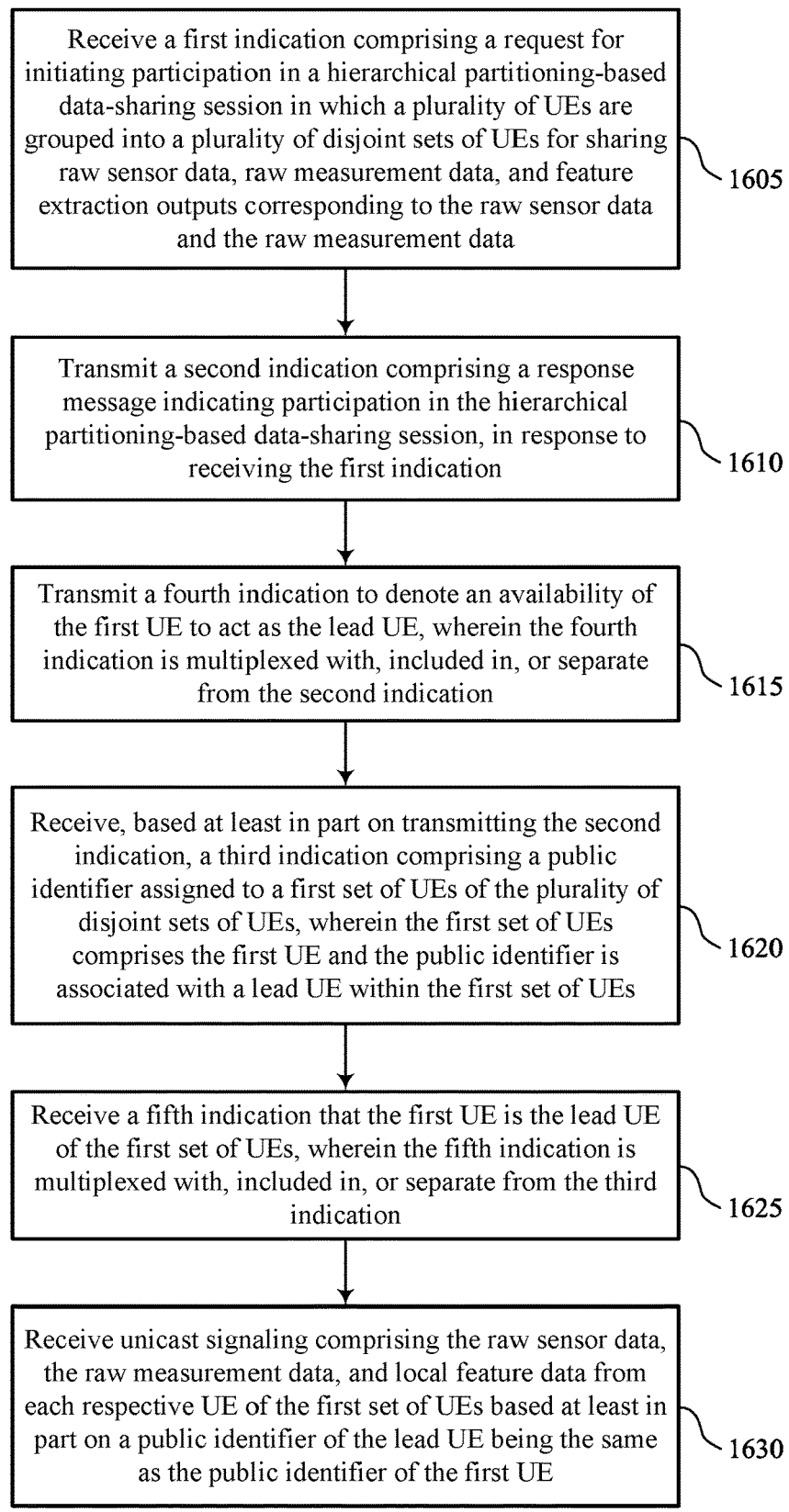

FIG. 16 shows a flowchart illustrating a method 1600 that supports hierarchical partitioning and sensor data aggregation in perceptive wireless communications systems in accordance with aspects of the present disclosure. The operations of the method 1600 may be implemented by a UE (which may be referred to as a first UE) or its components as described herein. For example, the operations of the method 1600 may be performed by a UE 115 (e.g., a lead UE) as described with reference to FIGS. 1 through 10. In some examples, a UE may execute a set of instructions to control the functional elements of the wireless UE to perform the described functions. Additionally, or alternatively, the wireless UE may perform aspects of the described functions using special-purpose hardware.

At 1605, the method may include receiving a first indication comprising a request for initiating participation in a hierarchical partitioning-based data-sharing session in which a plurality of UEs are grouped into a plurality of disjoint sets of UEs for sharing raw sensor data, raw measurement data, and feature extraction outputs corresponding to the raw sensor data and the raw measurement data. The operations of 1605 may be performed in accordance with examples as disclosed herein. In some examples, aspects of the operations of 1605 may be performed by a hierarchical data session request component 925 as described with reference to FIG. 9.

At 1610, the method may include transmitting a second indication comprising a response message indicating participation in the hierarchical partitioning based data-sharing session, in response to receiving the first indication. The operations of 1610 may be performed in accordance with examples as disclosed herein. In some examples, aspects of the operations of 1610 may be performed by a participation response message component 930 as described with reference to FIG. 9.

At 1615, the method may include transmitting a fourth indication to denote an availability of the first UE to act as the lead UE, wherein the fourth indication is multiplexed with, included in, or separate from the second indication. The operations of 1615 may be performed in accordance with examples as disclosed herein. In some examples, aspects of the operations of 1615 may be performed by a participation response message component 930 as described with reference to FIG. 9.

At 1620, the method may include receiving, based at least in part on transmitting the second indication, a third indication comprising a public identifier assigned to a first set of UEs of the plurality of disjoint sets of UEs, wherein the first set of UEs includes the first UE and the public identifier is associated with (e.g., assigned to, corresponding to, or indicating) a lead UE within the first set of UEs. The operations of 1620 may be performed in accordance with examples as disclosed herein. In some examples, aspects of the operations of 1620 may be performed by a hierarchical partition component 935 as described with reference to FIG. 9.

At 1625, the method may include receiving a fifth indication that the first UE is the lead UE of the first set of UEs, wherein the fifth indication is multiplexed with, included in, or separate from the third indication. The operations of 1625 may be performed in accordance with examples as disclosed herein. In some examples, aspects of the operations of 1625 may be performed by a lead assignment component 940 as described with reference to FIG. 9.

At 1630, the method may include receiving unicast signaling comprising the raw sensor data, the raw measurement data, and local feature data from each respective UE of the first set of UEs based at least in part on a public identifier of the lead UE being the same as the public identifier of the first UE. The operations of 1630 may be performed in accordance with examples as disclosed herein. In some examples, aspects of the operations of 1630 may be performed by a data component 945 as described with reference to FIG. 9.

Figure 17:
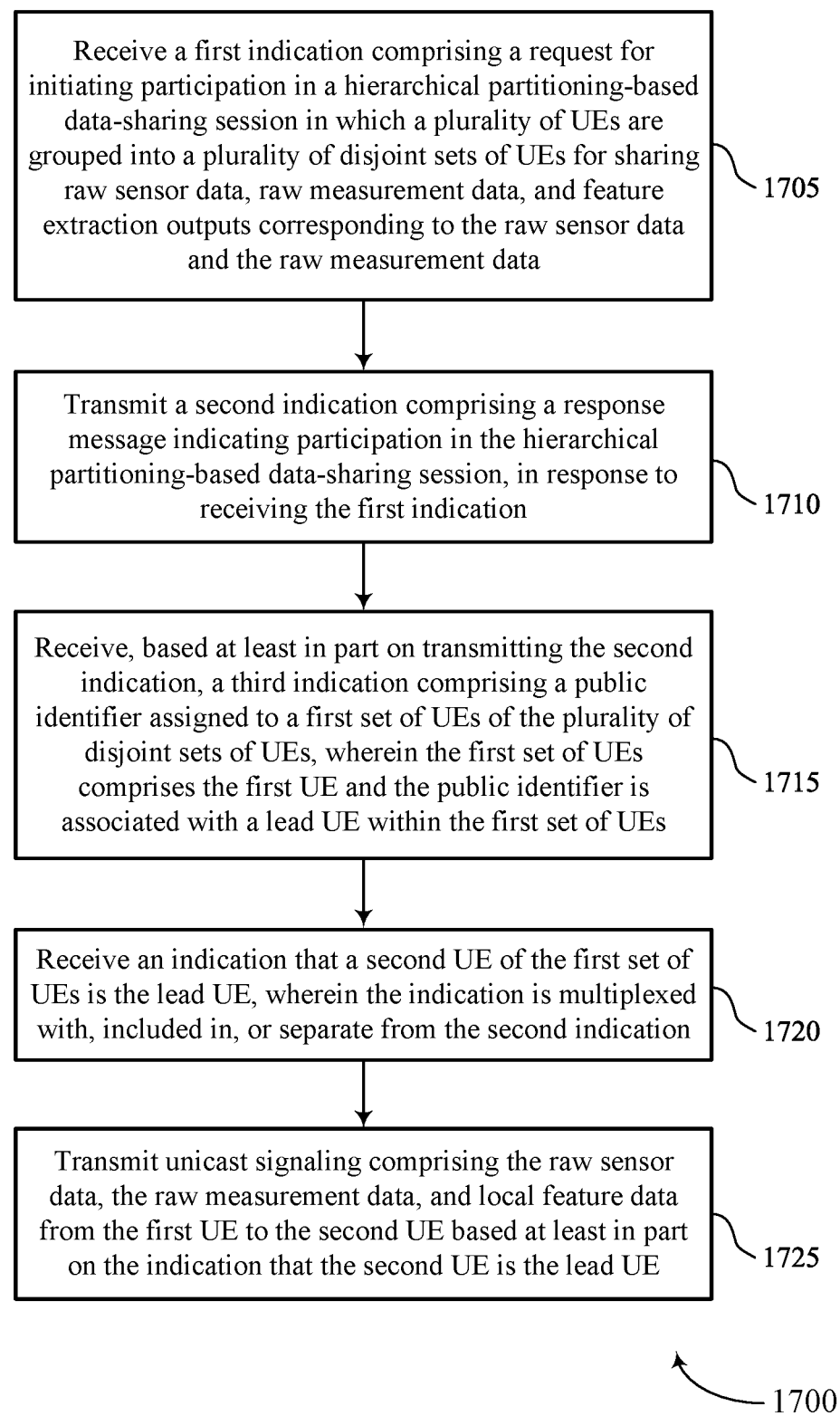

FIG. 17 shows a flowchart illustrating a method 1700 that supports hierarchical partitioning and sensor data aggregation in perceptive wireless communications systems in accordance with aspects of the present disclosure. The operations of the method 1700 may be implemented by a UE (which may be referred to as a first UE) or its components as described herein. For example, the operations of the method 1700 may be performed by a UE 115 (e.g., a non-lead UE) as described with reference to FIGS. 1 through 10. In some examples, a UE may execute a set of instructions to control the functional elements of the wireless UE to perform the described functions. Additionally, or alternatively, the wireless UE may perform aspects of the described functions using special-purpose hardware.

At 1705, the method may include receiving a first indication comprising a request for initiating participation in a hierarchical partitioning-based data-sharing session in which a plurality of UEs are grouped into a plurality of disjoint sets of UEs for sharing raw sensor data, raw measurement data, and feature extraction outputs corresponding to the raw sensor data and the raw measurement data. The operations of 1705 may be performed in accordance with examples as disclosed herein. In some examples, aspects of the operations of 1705 may be performed by a hierarchical data session request component 925 as described with reference to FIG. 9.

At 1710, the method may include transmitting a second indication comprising a response message indicating participation in the hierarchical partitioning based data-sharing session, in response to receiving the first indication. The operations of 1710 may be performed in accordance with examples as disclosed herein. In some examples, aspects of the operations of 1710 may be performed by a participation response message component 930 as described with reference to FIG. 9.

At 1715, the method may include receiving, based at least in part on transmitting the second indication, a third indication comprising a public identifier assigned to a first set of UEs of the plurality of disjoint sets of UEs, wherein the first set of UEs includes the first UE and the public identifier is associated with a lead UE within the first set of UEs. The operations of 1715 may be performed in accordance with examples as disclosed herein. In some examples, aspects of the operations of 1715 may be performed by a hierarchical partition component 935 as described with reference to FIG. 9.

At 1720, the method may include receiving an indication that a second UE of the first set of UEs is the lead UE, wherein the indication is multiplexed with, included in, or separate from the third indication. The operations of 1720 may be performed in accordance with examples as disclosed herein. In some examples, aspects of the operations of 1720 may be performed by a lead assignment component 940 as described with reference to FIG. 9.

At 1725, the method may include transmitting unicast signaling comprising the raw sensor data, the raw measurement data, and local feature data from the first UE to the second UE based at least in part on the indication that the second UE is the lead UE. The operations of 1725 may be performed in accordance with examples as disclosed herein. In some examples, aspects of the operations of 1725 may be performed by a data component 945 as described with reference to FIG. 9.

Figure 18:
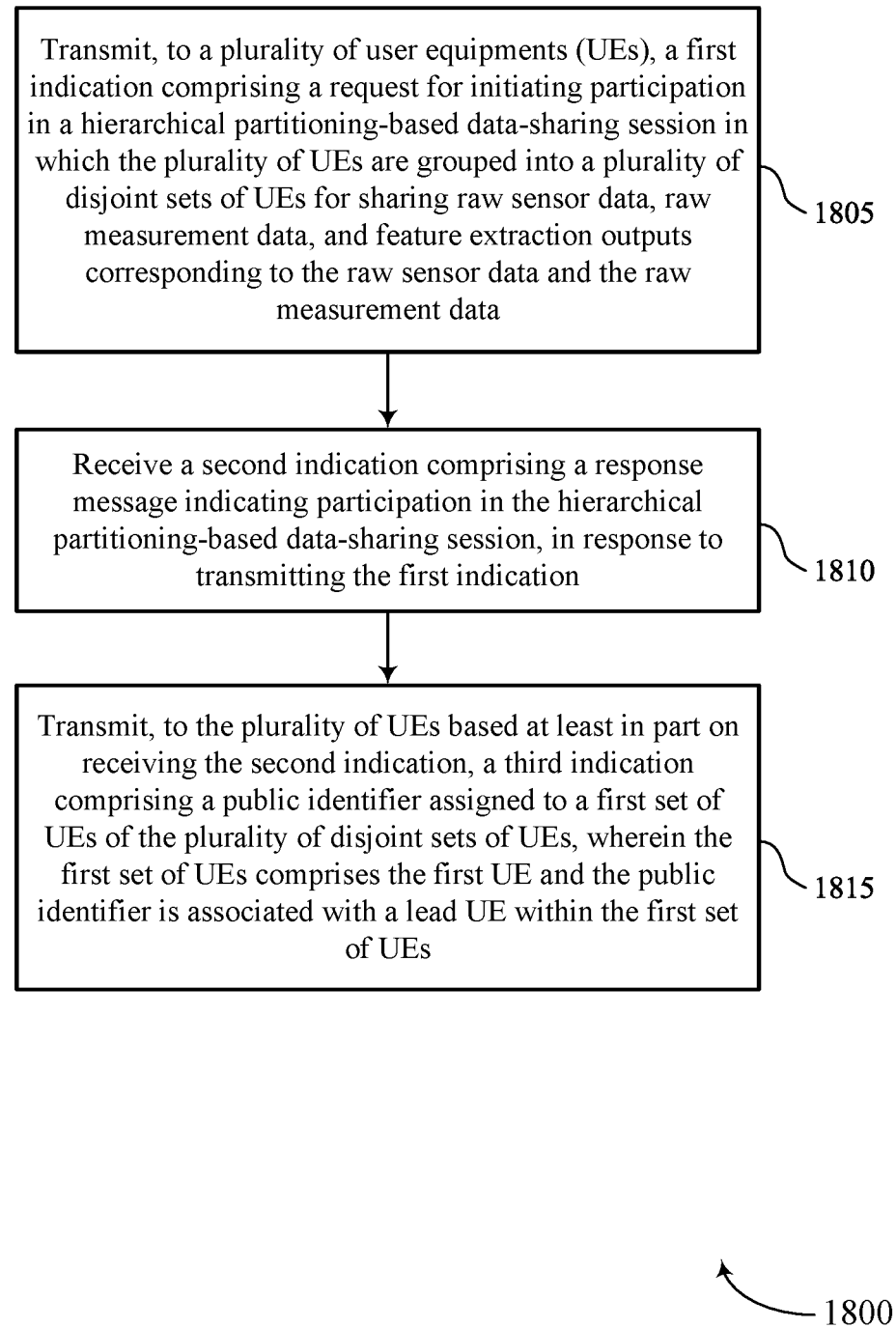

FIG. 18 shows a flowchart illustrating a method 1800 that supports hierarchical partitioning and sensor data aggregation in perceptive wireless communications systems in accordance with aspects of the present disclosure. The operations of the method 1800 may be implemented by a network entity (e.g., such as a network entity 105) or its components as described herein. For example, the operations of the method 1800 may be performed by a network entity as described with reference to FIGS. 1 through 6 and 11 through 14. In some examples, a network entity may execute a set of instructions to control the functional elements of the wireless network entity to perform the described functions. Additionally, or alternatively, the wireless network entity may perform aspects of the described functions using special-purpose hardware.

At 1805, the method may include transmitting, to a plurality of user equipments (UEs), a first indication comprising a request for initiating participation in a hierarchical partitioning-based data-sharing session in which a plurality of UEs are grouped a plurality of disjoint sets of UEs for sharing raw sensor data, raw measurement data, and feature extraction outputs corresponding to the raw sensor data and the raw measurement data. The operations of 1805 may be performed in accordance with examples as disclosed herein. In some examples, aspects of the operations of 1805 may be performed by a hierarchical data session request manager 1325 as described with reference to FIG. 13.

At 1810, the method may include receiving a second indication comprising a response message indicating participation in the hierarchical partitioning-based data-sharing session, in response to transmitting the first indication. The operations of 1810 may be performed in accordance with examples as disclosed herein. In some examples, aspects of the operations of 1810 may be performed by a participation response message manager 1330 as described with reference to FIG. 13.

At 1815, the method may include transmitting, to the plurality of UEs based at least in part on receiving the second indication, a third indication comprising a public identifier assigned to a first set of UEs of the plurality of disjoint sets of UEs, wherein the first set of UEs includes the first UE (e.g., a lead UE, and at least one non-lead UE) and the public identifier is associated with a lead UE within the first set of UEs. The operations of 1815 may be performed in accordance with examples as disclosed herein. In some examples, aspects of the operations of 1815 may be performed by a hierarchical partition manager 1335 as described with reference to FIG. 13.

Figure 19:
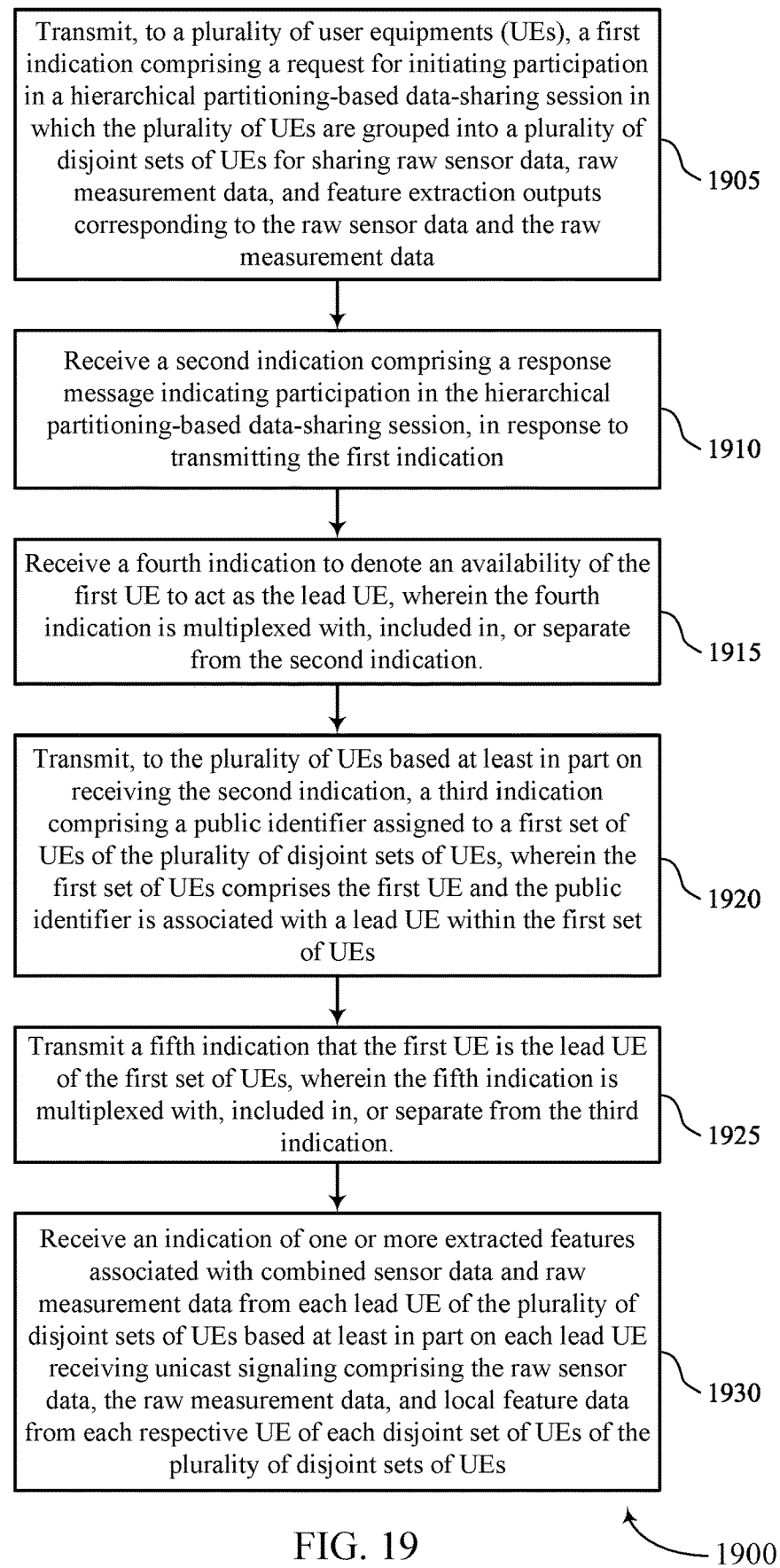

FIG. 19 shows a flowchart illustrating a method 1900 that supports hierarchical partitioning and sensor data aggregation in perceptive wireless communications systems in accordance with aspects of the present disclosure. The operations of the method 1900 may be implemented by a network entity or its components as described herein. For example, the operations of the method 1900 may be performed by a network entity as described with reference to FIGS. 1 through 6 and 11 through 14. In some examples, a network entity may execute a set of instructions to control the functional elements of the wireless network entity to perform the described functions. Additionally, or alternatively, the wireless network entity may perform aspects of the described functions using special-purpose hardware.

At 1905, the method may include transmitting, to a plurality of user equipments (UEs), a first indication comprising a request for initiating participation in a hierarchical partitioning-based data-sharing session in which a plurality of UEs are grouped a plurality of disjoint sets of UEs for sharing raw sensor data, raw measurement data, and feature extraction outputs corresponding to the raw sensor data and the raw measurement data. The operations of 1905 may be performed in accordance with examples as disclosed herein. In some examples, aspects of the operations of 1905 may be performed by a hierarchical data session request manager 1325 as described with reference to FIG. 13.

At 1910, the method may include receiving a second indication comprising a response message indicating participation in the hierarchical partitioning-based data-sharing session, in response to transmitting the first indication. The operations of 1910 may be performed in accordance with examples as disclosed herein. In some examples, aspects of the operations of 1910 may be performed by a participation response message manager 1330 as described with reference to FIG. 13.

At 1915, the method may include receiving a fourth indication to denote an availability of the first UE (e.g., at least part of the set of multiple UEs) to act as the lead UE, wherein the fourth indication is multiplexed with, included in, or separate from the second indication. The operations of 1915 may be performed in accordance with examples as disclosed herein. In some examples, aspects of the operations of 1915 may be performed by a participation response message manager 1330 as described with reference to FIG. 13.

At 1920, the method may include transmitting, to the plurality of UEs based at least in part on receiving the second indication, a third indication comprising a public identifier assigned to a first set of UEs of the plurality of disjoint sets of UEs, wherein the first set of UEs includes the first UE (e.g., a lead UE and at least one non-lead UE) and the public identifier is associated with a lead UE within the first set of UEs. The operations of 1920 may be performed in accordance with examples as disclosed herein. In some examples, aspects of the operations of 1920 may be performed by a hierarchical partition manager 1335 as described with reference to FIG. 13.

At 1925, the method may include transmitting a fifth indication that the first UE is the lead UE of the first set of UEs, wherein the fifth indication is multiplexed with, included in, or separate from the third indication. The operations of 1925 may be performed in accordance with examples as disclosed herein. In some examples, aspects of the operations of 1925 may be performed by a lead assignment manager 1340 as described with reference to FIG. 13.

At 1930, the method may include receiving an indication of one or more extracted features associated with combined sensor and data and the raw measurement data from each lead UE of the plurality of disjoint sets of UEs based at least in part on each lead UE receiving unicast signaling comprising the raw sensor data, raw measurement data, and local feature data from each respective UE of each disjoint set of UEs of the plurality of disjoint sets of UEs. The operations of 1930 may be performed in accordance with examples as disclosed herein. In some examples, aspects of the operations of 1930 may be performed by an extracted features manager 1345 as described with reference to FIG. 13.

The following provides an overview of aspects of the present disclosure:

Aspect 1: A method for wireless communications at a first UE, comprising: receiving a first indication comprising a request for initiating participation in a hierarchical partitioning-based data-sharing session in which a plurality of UEs are grouped into a plurality of disjoint sets of UEs for sharing raw sensor data, raw measurement data, and feature extraction outputs corresponding to the raw sensor data and the raw measurement data; transmitting a second indication comprising a response message indicating participation in the hierarchical partitioning based data-sharing session, in response to receiving the first indication; and receiving, based at least in part on transmitting the second indication, a third indication comprising a public identifier assigned to a first set of UEs of the plurality of disjoint sets of UEs, wherein the first set of UEs comprises the first UE and the public identifier is associated with a lead UE within the first set of UEs.

Aspect 2: The method of aspect 1, further comprising: transmitting a fourth indication to denote an availability of the first UE to act as the lead UE, wherein the fourth indication is multiplexed with, included in, or separate from the second indication; receiving a fifth indication that the first UE is the lead UE of the first set of UEs, wherein the fifth indication is multiplexed with, included in, or separate from the third indication; and receiving unicast signaling comprising the raw sensor data, the raw measurement data, and local feature data from each respective UE of the first set of UEs based at least in part on a public identifier of the lead UE being the same as the public identifier of the first UE.

Aspect 3: The method of aspect 2, further comprising: transmitting an indication of one or more extracted features associated with combined raw sensor data, raw measurement data, and local feature data to a network entity based at least in part on the first UE receiving the unicast signaling comprising the raw sensor, the raw measurement data, and the local feature data.

Aspect 4: The method of any of aspects 2 through 3, wherein receiving the fifth indication that the first UE is the lead UE is based at least in part on transmitting the fourth indication that the first UE is capable of performing as the lead UE.

Aspect 5: The method of any of aspects 2 through 4, further comprising: transmitting one or more parameters comprising location information, a quantity of sensor data generated by the first UE, computation power capability associated with the first UE, or any combination thereof, wherein receiving the fifth indication that the first UE is the lead UE is based at least in part on the one or more parameters.

Aspect 6: The method of any of aspects 2 through 5, further comprising: transmitting, to a network entity, partition reporting information comprising one or more of sensor data associated with the first set of UEs, sensor data extraction information associated with the first set of UEs, position information associated with the first UE or the first set of UEs, object occlusion information associated with the first set of UEs, partition cost information for sensor data associated with one or more UEs included in the first set of UEs as well as one or more UEs excluded from the first set of UEs but included in the plurality of disjoint sets of UEs, or any combination thereof; and receiving a sixth indication indicating the public identifier of an updated first set of UEs of a plurality of updated disjoint sets of UEs, an updated indication of a new lead UE, or any combination thereof.

Aspect 7: The method of aspect 6, further comprising: calculating a cost value associated with a partition between the first set of UEs and the second set of UEs, the partition cost information being based on the raw sensor data, the raw measurement data, and local feature data received.

Aspect 8: The method of any of aspects 6 through 7, wherein the partition cost information comprises an indication of a decrease in an accuracy level of feature extraction associated with sensor data shared by the first set of UEs with the lead UE based, at least in part, on an absence of the one or more UEs of the second set of UEs from the first set of UEs; and receiving the sixth indication is based at least in part on the partition cost information.

Aspect 9: The method of any of aspects 1 through 8, further comprising: broadcasting an indication of one or more extracted features associated with the raw sensor data and the raw measurement data to a plurality of UEs within and outside the first set of UEs based at least in part on an existing connection for feature data sharing between the first UE and the plurality of UEs.

Aspect 10: The method of any of aspects 1 through 9, further comprising: receiving an indication that a second UE of the first set of UEs is the lead UE, wherein the indication is multiplexed with, included in, or separate from the third indication; and transmitting unicast signaling comprising the raw sensor data, the raw measurement data, and local feature data from the first UE to the second UE based at least in part on the indication that the second UE is the lead UE.

Aspect 11: The method of aspect 10, further comprising: receiving, from the second UE based at least in part on transmitting the unicast signaling comprising the raw sensor data, the raw measurement data, and local feature data, a broadcast message comprising one or more extracted features associated with the raw sensor data, the raw measurement data, and the local feature data.

Aspect 12: The method of any of aspects 10 through 11, further comprising: transmitting the raw sensor data, the raw measurement data, an indication of one or more locally extracted features associated with the raw sensor data or the raw measurement data, or any combination thereof, to a network entity.

Aspect 13: The method of any of aspects 1 through 12, wherein the sharing raw sensor data comprises sharing radio detection and ranging data, lighting detection and ranging data, camera image data, stereo-vision image data, velocity information, position information, or any combination thereof.

Aspect 14: The method of any of aspects 1 through 13, wherein the sharing raw measurement data comprises sharing wireless channel statistics, channel state information, or a combination thereof, of a vehicular UE or a cellular UE paired with the vehicular UE, or any combination thereof.

Aspect 15: The method of any of aspects 1 through 14, wherein the feature extraction outputs comprise object bounding, objection location estimation, object orientation estimation, object detection, object classification, confidence measurement, mapping, compression of wireless channel information, or any combination thereof, based at least in part on aggregated sensor data, wireless data, and raw data.

Aspect 16: A method for wireless communications at a network entity, comprising: transmitting, to a plurality of user equipments (UEs), a first indication comprising a request for initiating participation in a hierarchical partitioning-based data-sharing session in which a plurality of UEs are grouped into a plurality of disjoint sets of UEs for sharing raw sensor data, raw measurement data, and feature extraction outputs corresponding to the raw sensor data and the raw measurement data; receiving a second indication comprising a response message indicating participation in the hierarchical partitioning-based data-sharing session, in response to transmitting the first indication; and transmitting, to the plurality of UEs based at least in part on receiving the second indication, a third indication comprising a public identifier assigned to a first set of UEs of the plurality of disjoint sets of UEs, wherein the first set of UEs comprises the first UE and the public identifier is associated with a lead UE within the first set of UEs.

Aspect 17: The method of aspect 16, further comprising: receiving a fourth indication to denote an availability of the first UE to act as the lead UE, wherein the fourth indication is multiplexed with, included in, or separate from the second indication; transmitting a fifth indication that the first UE is the lead UE of the first set of UEs, wherein the fifth indication is multiplexed with, included in, or separate from the third indication; and receiving an indication of one or more extracted features associated with combined sensor and data and the raw measurement data from each lead UE of the plurality of disjoint sets of UEs based at least in part on each lead UE receiving unicast signaling comprising the raw sensor data, raw measurement data, and local feature data from each respective UE of each disjoin set of UEs of the plurality of disjoint sets of UEs.

Aspect 18: The method of aspect 17, wherein transmitting the fifth indication that the first UE is the lead UE is based at least in part on receiving the indication that the first UE is capable of performing as the lead UE.

Aspect 19: The method of any of aspects 17 through 18, further comprising: receiving one or more parameters comprising location information, a quantity of sensor data generated by the first UE, computation power capability associated with the first UE, or any combination thereof, wherein receiving the indication that the first UE is the lead UE is based at least in part on the one or more parameters.

Aspect 20: The method of any of aspects 16 through 19, further comprising: receiving, from one or more UEs of the first set of UEs, partition reporting information comprising one or more of the raw sensor data and the raw measurement data associated with the first set of UEs, sensor data extraction information associated with the first set of UEs, position information associated with the first UE or the first set of UEs, object occlusion information associated with the first set of UEs, partition cost information for sensor data associated with one or more UEs of a second set of UEs of the plurality of disjoint sets of UEs, or any combination thereof, and transmitting, to the first set of UEs, the second set of UEs, or both, a sixth indication indicating the public identifier of an updated first set of UEs of a plurality of updated disjoint sets of UEs, an updated indication of a new lead UE, or any combination thereof.

Aspect 21: The method of aspect 20, wherein the partition cost information comprises a cost value associated with a partition between the first set of UEs and the second set of UEs.

Aspect 22: The method of any of aspects 20 through 21, wherein the partition cost information comprises an indication of a decrease in an accuracy level of feature extraction associated with sensor data shared by the first set of UEs with the lead UE based at least in part on an absence of the one or more UEs of the second set of UEs from the first set of UEs, and transmitting the sixth indication is based at least in part on the partition cost information.

Aspect 23: The method of any of aspects 16 through 22, wherein the sharing raw sensor data comprises sharing radio detection and ranging data, lighting detection and ranging data, camera image data, stereo-vision image data, velocity information, position information, or any combination thereof.

Aspect 24: The method of any of aspects 16 through 23, wherein the sharing raw measurement data comprises sharing wireless channel statistics, channel state information, or a combination thereof, of a vehicular UE or a cellular UE paired with the vehicular UE, or any combination thereof.

Aspect 25: The method of any of aspects 16 through 24, wherein the feature extraction outputs comprise object bounding, objection location estimation, object orientation estimation, object detection, object classification, confidence measurement, mapping, compression of wireless channel information, or any combination thereof, based at least in part on aggregated sensor data, wireless data, and raw data.

Aspect 26: An apparatus for wireless communications at a first UE, comprising: at least one processor; memory coupled with the at least one processor; and instructions stored in the at least one memory and executable by the at least one processor to cause the apparatus to perform a method of any of aspects 1 through 15.

Aspect 27: An apparatus for wireless communications at a first UE, comprising at least one means for performing a method of any of aspects 1 through 15.

Aspect 28: A non-transitory computer-readable medium storing code for wireless communications at a first UE, the code comprising instructions executable by at least one processor to perform a method of any of aspects 1 through 15.

Aspect 29: An apparatus for wireless communications at a network entity, comprising at least one processor; memory coupled with the at least one processor; and instructions stored in the at least one memory and executable by the at least one processor to cause the apparatus to perform a method of any of aspects 16 through 25.

Aspect 30: An apparatus for wireless communications at a network entity, comprising at least one means for performing a method of any of aspects 16 through 25.

Aspect 31: A non-transitory computer-readable medium storing code for wireless communications at a network entity, the code comprising instructions executable by at least one processor to perform a method of any of aspects 16 through 25.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the at least one processor may be any processor, controller, microcontroller, or state machine. At least one processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by at least one processor, firmware, or any combination thereof. If implemented using software executed by at least one processor, the functions may be stored as or transmitted using one or more instructions or code of a computer-readable medium. Other examples and implementations are within the scope of the disclosure and appended claims. For example, due to the nature of software, functions described herein may be implemented using software executed by at least one processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communications at a first user equipment (UE), comprising:
   at least one processor; and
   at least one memory coupled with the at least one processor, wherein the at least one memory comprises instructions executable by the at least one processor to cause the apparatus to:
      receive a first indication comprising a request for initiating participation in a hierarchical partitioning-based data-sharing session in which a plurality of UEs are grouped into a plurality of disjoint sets of UEs for sharing raw sensor data, raw measurement data, and feature extraction outputs corresponding to the raw sensor data and the raw measurement data;
      transmit a second indication comprising a response message indicating participation in the hierarchical partitioning-based data-sharing session, in response to receiving the first indication; and
      receive, based at least in part on transmitting the second indication, a third indication comprising a public identifier assigned to a first set of UEs of the plurality of disjoint sets of UEs, wherein the first set of UEs comprises the first UE and the public identifier is associated with a lead UE within the first set of UEs.

2. The apparatus of claim 1, wherein the instructions are further executable by the at least one processor to cause the apparatus to:
   transmit a fourth indication to denote an availability of the first UE to act as the lead UE, wherein the fourth indication is multiplexed with, included in, or separate from the second indication;
   receive a fifth indication that the first UE is the lead UE of the first set of UEs, wherein the fifth indication is multiplexed with, included in, or separate from the third indication; and
   receive unicast signaling comprising the raw sensor data, the raw measurement data, and local feature data from each respective UE of the first set of UEs based at least in part on a public identifier of the lead UE being the same as the public identifier of the first UE.

3. The apparatus of claim 2, wherein the instructions are further executable by the at least one processor to cause the apparatus to:
   transmit an indication of one or more extracted features associated with combined raw sensor data, raw measurement data, and local feature data to a network entity based at least in part on the first UE receiving the unicast signaling comprising the raw sensor data, the raw measurement data, and the local feature data.

4. The apparatus of claim 2, wherein receiving the fifth indication that the first UE is the lead UE is based at least in part on transmitting the fourth indication that the first UE is capable of performing as the lead UE.

5. The apparatus of claim 2, wherein the instructions are further executable by the at least one processor to cause the apparatus to:
   transmit one or more parameters comprising location information, a quantity of sensor data generated by the first UE, computation power capability associated with the first UE, or any combination thereof, wherein receiving the fifth indication that the first UE is the lead UE is based at least in part on the one or more parameters.

6. The apparatus of claim 2, wherein the instructions are further executable by the at least one processor to cause the apparatus to:
   transmit, to a network entity, partition reporting information comprising one or more of sensor data associated with the first set of UEs, sensor data extraction information associated with the first set of UEs, position information associated with the first UE or the first set of UEs, object occlusion information associated with the first set of UEs, partition cost information for sensor data associated with one or more UEs included in the first set of UEs as well as one or more UEs excluded from the first set of UEs but included in the plurality of disjoint sets of UEs, or any combination thereof; and
   receive a sixth indication indicating the public identifier of an updated first set of UEs of a plurality of updated disjoint sets of UEs, an updated indication of a new lead UE, or any combination thereof.

7. The apparatus of claim 6, wherein the instructions are further executable by the at least one processor to cause the apparatus to:
   calculate a cost value associated with a partition between the first set of UEs and the second set of UEs, the partition cost information being based on the raw sensor data, the raw measurement data, and the local feature data received.

8. The apparatus of claim 6, wherein:
   the partition cost information comprises an indication of a decrease in an accuracy level of feature extraction associated with sensor data shared by the first set of UEs with the lead UE based, at least in part, on an absence of the one or more UEs of the second set of UEs from the first set of UEs; and
   receiving the sixth indication is based at least in part on the partition cost information.

9. The apparatus of claim 1, wherein the instructions are further executable by the at least one processor to cause the apparatus to:
   broadcast an indication of one or more extracted features associated with the raw sensor data and the raw measurement data to a plurality of UEs within and outside the first set of UEs based at least in part on an existing connection for feature data sharing between the first UE and the plurality of UEs.

10. The apparatus of claim 1, wherein the instructions are further executable by the at least one processor to cause the apparatus to:
    receive an indication that a second UE of the first set of UEs is the lead UE, wherein the indication is multiplexed with, included in, or separate from the second indication; and
    transmit unicast signaling comprising the raw sensor data, the raw measurement data, and local feature data from the first UE to the second UE based at least in part on the indication that the second UE is the lead UE.

11. The apparatus of claim 10, wherein the instructions are further executable by the at least one processor to cause the apparatus to:
    receive, from the second UE based at least in part on transmitting the unicast signaling comprising the raw sensor data, the raw measurement data, and the local feature data, a broadcast message comprising one or more extracted features associated with the raw sensor data, the raw measurement data, and the local feature data.

12. The apparatus of claim 10, wherein the instructions are further executable by the at least one processor to cause the apparatus to:
transmit the raw sensor data, the raw measurement data, an indication of one or more locally extracted features associated with the raw sensor data or the raw measurement data, or any combination thereof, to a network entity.

13. The apparatus of claim 1, wherein the sharing raw sensor data comprises sharing radio detection and ranging data, lighting detection and ranging data, camera image data, stereo-vision image data, velocity information, position information, or any combination thereof.

14. The apparatus of claim 1, wherein the sharing raw measurement data comprises sharing wireless channel statistics, channel state information, or a combination thereof, of a vehicular UE or a cellular UE paired with the vehicular UE, or any combination thereof.

15. The apparatus of claim 1, wherein the feature extraction outputs comprise object bounding, objection location estimation, object orientation estimation, object detection, object classification, confidence measurement, mapping, compression of wireless channel information, or any combination thereof, based at least in part on aggregated sensor data, wireless data, and raw data.

16. An apparatus for wireless communications at a network entity, comprising:
at least one processor; and
at least one memory coupled with the at least one processor, wherein the at least one memory comprises instructions executable by the at least one processor to cause the apparatus to:
transmit, to a plurality of user equipments (UEs), a first indication comprising a request for initiating participation in a hierarchical partitioning-based data-sharing session in which the plurality of UEs are grouped into a plurality of disjoint sets of UEs for sharing raw sensor data, raw measurement data, and feature extraction outputs corresponding to the raw sensor data and the raw measurement data;
receive a second indication comprising a response message indicating participation in the hierarchical partitioning-based data-sharing session, in response to transmitting the first indication; and
transmit, to the plurality of UEs based at least in part on receiving the second indication, a third indication comprising a public identifier assigned to a first set of UEs of the plurality of disjoint sets of UEs, wherein the first set of UEs comprises a first UE and the public identifier is associated with a lead UE within the first set of UEs.

17. The apparatus of claim 16, wherein the instructions are further executable by the at least one processor to cause the apparatus to:
receive a fourth indication to denote an availability of the first UE to act as the lead UE, wherein the fourth indication is multiplexed with, included in, or separate from the second indication;
transmit a fifth indication that the first UE is the lead UE of the first set of UEs, wherein the fifth indication is multiplexed with, included in, or separate from the third indication; and receive an indication of one or more extracted features associated with combined raw sensor data and raw measurement data from each lead UE of the plurality of disjoint sets of UEs based at least in part on each lead UE receiving unicast signaling comprising the raw sensor data, the raw measurement data, and local feature data from each respective UE of each disjoint set of UEs of the plurality of disjoint sets of UEs.

18. The apparatus of claim 17, wherein transmitting the fifth indication that the first UE is the lead UE is based at least in part on receiving the indication that the first UE is capable of performing as the lead UE.

19. The apparatus of claim 17, wherein the instructions are further executable by the at least one processor to cause the apparatus to:
receive one or more parameters comprising location information, a quantity of sensor data generated by the first UE, computation power capability associated with the first UE, or any combination thereof, wherein receiving the indication that the first UE is the lead UE is based at least in part on the one or more parameters.

20. The apparatus of claim 16, wherein the instructions are further executable by the at least one processor to cause the apparatus to:
receive, from one or more UEs of the first set of UEs, partition reporting information comprising one or more of the raw sensor data and the raw measurement data associated with the first set of UEs, sensor data extraction information associated with the first set of UEs, position information associated with the first UE or the first set of UEs, object occlusion information associated with the first set of UEs, partition cost information for sensor data associated with one or more UEs of a second set of UEs of the plurality of disjoint sets of UEs, or any combination thereof; and
transmit, to the first set of UEs, the second set of UEs, or both, a sixth indication indicating the public identifier of an updated first set of UEs of a plurality of updated disjoint sets of UEs, an updated indication of a new lead UE of the updated first set of UEs, or any combination thereof.

21. The apparatus of claim 20, wherein the partition cost information comprises a cost value associated with a partition between the first set of UEs and the second set of UEs.

22. The apparatus of claim 20, wherein:
the partition cost information comprises an indication of a decrease in an accuracy level of feature extraction associated with sensor data shared by the first set of UEs with the lead UE based at least in part on an absence of the one or more UEs of the second set of UEs from the first set of UEs, and
transmitting the sixth indication is based at least in part on the partition cost information.

23. The apparatus of claim 16, wherein the sharing raw sensor data comprises sharing radio detection and ranging data, lighting detection and ranging data, camera image data, stereo-vision image data, velocity information, position information, or any combination thereof.

24. The apparatus of claim 16, wherein the sharing raw measurement data comprises sharing wireless channel statistics, channel state information, or a combination thereof, of a vehicular UE or a cellular UE paired with the vehicular UE, or any combination thereof.

25. The apparatus of claim 16, wherein the feature extraction outputs comprise object bounding box, object location estimation, object orientation estimation, object detection, object classification, confidence value, mapping, compression of wireless channel information, or any combination thereof, based at least in part on aggregated sensor data, wireless data, and raw data.

26. A method for wireless communications at a first user equipment (UE), comprising:
receiving a first indication comprising a request for initiating participation in a hierarchical partitioning-based data-sharing session in which a plurality of UEs are grouped into a plurality of disjoint sets of UEs for sharing raw sensor data, raw measurement data, and feature extraction outputs corresponding to the raw sensor data and the raw measurement data;
transmitting a second indication comprising a response message indicating participation in the hierarchical partitioning-based data-sharing session, in response to receiving the first indication; and
receiving, based at least in part on transmitting the second indication, a third indication comprising a public identifier assigned to a first set of UEs of the plurality of disjoint sets of UEs, wherein the first set of UEs comprises the first UE and the public identifier is associated with a lead UE within the first set of UEs.

27. The method of claim 26, further comprising:
transmitting a fourth indication to denote an availability of the first UE to act as the lead UE, wherein the fourth indication is multiplexed with, included in, or separate from the second indication;
receiving a fifth indication that the first UE is the lead UE of the first set of UEs, wherein the fifth indication is multiplexed with, included in, or separate from the third indication; and
receiving unicast signaling comprising the raw sensor data, the raw measurement data, and local feature data from each respective UE of the first set of UEs based at least in part on a public identifier of the lead UE being the same as the public identifier of the first UE.

28. The method of claim 27, further comprising:
transmitting, to a network entity, partition reporting information comprising one or more of sensor data associated with the first set of UEs, sensor data extraction information associated with the first set of UEs, position information associated with the first UE or the first set of UEs, object occlusion information associated with the first set of UEs, partition cost information for sensor data associated with one or more UEs included in the first set of UEs as well as one or more UEs excluded from the first set of UEs but included in the plurality of disjoint sets of UEs, or any combination thereof; and
receiving a sixth indication indicating the public identifier of an updated first set of UEs of a plurality of updated disjoint sets of UEs, an updated indication of a new lead UE, or any combination thereof.

29. The method of claim 26, further comprising:
broadcasting an indication of one or more extracted features associated with the raw sensor data and the raw measurement data to a plurality of UEs within and outside the first set of UEs based at least in part on an existing connection for feature data sharing between the first UE and the plurality of UEs.

30. A method for wireless communications at a network entity, comprising:
transmitting, to a plurality of user equipments (UEs), a first indication comprising a request for initiating participation in a hierarchical partitioning-based data-sharing session in which the plurality of UEs are grouped into a plurality of disjoint sets of UEs for sharing raw sensor data, raw measurement data, and feature extraction outputs corresponding to the raw sensor data and the raw measurement data;
receiving a second indication comprising a response message indicating participation in the hierarchical partitioning-based data-sharing session, in response to transmitting the first indication; and
transmitting, to the plurality of UEs based at least in part on receiving the second indication, a third indication comprising a public identifier assigned to a first set of UEs of the plurality of disjoint sets of UEs, wherein the first set of UEs comprises the first UE and the public identifier is associated with a lead UE within the first set of UEs.

* * * * *